United States Patent [19]

Miyasaka et al.

[11] Patent Number: 5,274,419
[45] Date of Patent: Dec. 28, 1993

[54] CAMERA AND PHOTOSENSITIVE MATERIAL FEED UNIT USEFUL THEREFOR

[75] Inventors: Eiji Miyasaka; Masayuki Handa; Morihiro Takeda; Hiroyuki Tsujino, all of Hikone, Japan

[73] Assignee: Dainippon Screen Mfg. Co., Ltd., Shiga, Japan

[21] Appl. No.: 627,126

[22] Filed: Dec. 13, 1990

[30] Foreign Application Priority Data

Dec. 20, 1989 [JP] Japan .............................. 1-147281[U]
Dec. 20, 1989 [JP] Japan .................................. 1-332405
Dec. 20, 1989 [JP] Japan .................................. 1-332406

[51] Int. Cl.⁵ ...................... G03B 27/50; G03G 15/28
[52] U.S. Cl. ......................................... 355/51; 355/56; 355/61; 355/235; 355/244
[58] Field of Search ........................ 355/28, 29, 40, 41, 355/51, 55, 56, 61, 77, 243, 244, 310, 311, 233, 234, 235

[56] References Cited

U.S. PATENT DOCUMENTS 4,046,470  9/1977  Yamamoto ........................... 355/234
4,332,461  6/1982  Cail et al. ............................. 355/235

FOREIGN PATENT DOCUMENTS 50-120342   9/1975  Japan .
50-147336  11/1975  Japan .
1-189657    7/1989  Japan .

Primary Examiner—D. Rutledge
Attorney, Agent, or Firm—Lowe, Price, LeBlanc & Becker

[57] ABSTRACT

A reproduction magnification of an image to be reproduced is inputted through a inputting device. A projection optical system is adjusted according to the reproduction magnification, and then projects image light reflected from an original in the form of a slit onto a photosensitive material sheet. As projecting the slit image light, the original and the photosensitive material sheet are synchronously fed each other.

25 Claims, 20 Drawing Sheets

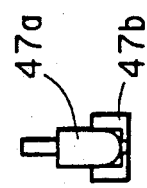
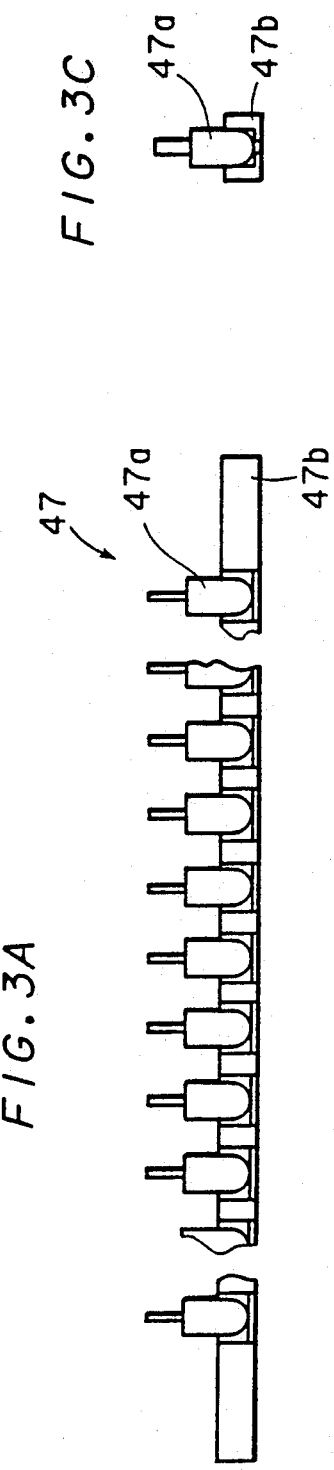
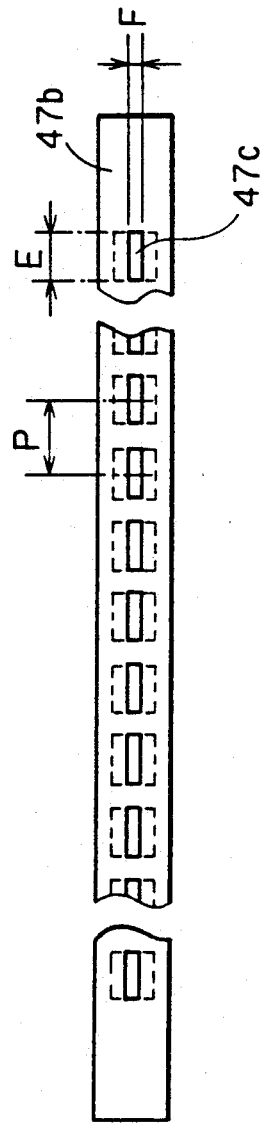
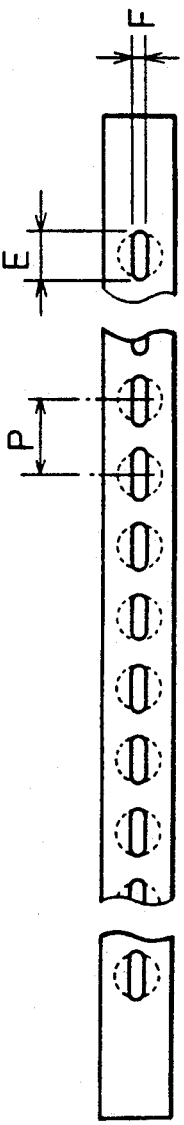

CAMERA AND PHOTOSENSITIVE MATERIAL FEED UNIT USEFUL THEREFOR

BACKGROUND OF THE INVENTION

1. Field of the Invention

The present invention relates to a camera for reproducing an image onto a photosensitive material sheet. The present invention also relates to a photosensitive material feed unit for use in such a camera.

2. Description of the Prior Art

The camera disclosed in Japanese Patent Laid-Open Gazette No. 1-189657 can be taken as an example of a camera for producing a printing plate, the reproduction camera being proposed also by the inventor of the present application. The camera comprises a projection optical system which illuminates an original having an image to be reproduced and which directs image light reflected from the original toward a photosensitive material. The projection optical system has a slit. Thus, image light being projected onto the photosensitive material through the projection optical system is provided in the form of a slit. In the camera, the photosensitive material and the original are synchronously fed while the slit image light is projected onto the photosensitive material. Consequently, the image of the original is reproduced on the photosensitive material. The term "scan-exposure camera" refers to this type of camera.

The scan-exposure camera is capable of changing a reproduction magnification of a reproduced image by adjusting a magnification of the projection optical system installed therein. In addition, by repeatedly reproducing an image of the same single original, the camera produces a printing plate on which a plurality of images are placed side by side. To reproduce a plurality of images on a single printing plate is referred to as "multi-placing."

In reproducing a plurality of images to produce a printing plate, there has been a large demand for a different magnification for each reproduced image. Assuming here, for example, to print two identical leaflets which are different only in size. If images of a high and a low magnification are reproduced on the same printing plate, only a single printing plate will be necessary. This saves the number of printing plates required as well as labor involved in printing.

The prior art scan-exposure camera, in spite of the demand as above, is not capable of changing a reproduction magnification for each image to be reproduced on the same and single printing plate.

Further, even if capable of changing a magnification for each image to be reproduced, the conventional scan-exposure camera is not still free from a problem as recited in the following: That is, it is extremely difficult to treat a region other than a so-called "scanning region" in which each reproduced image is included. In this specification, the term "non-scanning region" will refer to a region other than a scanning region. In general, a scan-exposure camera reproduces a plurality of images onto a negative type photosensitive material, to thereby form a printing plate. An unexposed portion of a negative photosensitive material is inked but an exposed portion thereof is not inked. A printing plate available from such a scan-exposure camera is applied to a printer without receiving any additional treatments prior to printing. Therefore, non-scanning regions must be generally exposed without fail in order to obviate inking thereto. On the other hand, when images are reproduced at different magnifications, sizes of non-scanning regions vary accordingly depending on the magnifications. Thus, it is extremely difficult to generally expose the non-scanning regions.

As a possible solution to this problem, a bottom surface of a platen cover may be white-colored. This causes illumination light to be reflected, so that the non-scanning regions of a photosensitive material are entirely exposed with the light beam reflected from the bottom surface thereof. Adopting this solution, however, would lead to an increased size of a scan-exposure camera if non-scanning regions are large.

In addition to the two problems described above, there is another problem in the conventional scan-exposure camera, that is, a problem relating to an original setting position. As well known in the art, there are two ways of mounting a printing plate to a printer, that is, top-or-bottom mounting and side mounting. A printing plate takes a holding space in which it is fixed to a plate cylinder, and the holding space must be taken differently depending on a type of the printing plate, i.e., whether the printing plate is of a top-or-bottom-mounted type or of a side-mounted type. This requires an original to be properly mounted to an original holder in conformance with a type of a printing plate. In the conventional scan-exposure camera, however, an optimum setting position of an original to be mounted to an original holder varies according to a mounting method and a reproduction magnification. This requires movement of the original in pursuit of the optimum position at every original replacement, thus highly labor consuming.

SUMMARY OF THE INVENTION

The present invention is directed to a camera for reproducing an image onto a photosensitive material sheet. The camera comprises an original feed means for feeding an original in an original feeding direction; and photosensitive material feed means for feeding a photosensitive material sheet in a photosensitive material feeding direction. Means are provided for inputting a scanning length of a scanning region which includes an image to be reproduced and a reproduction magnification of the image. First computation means calculate a feeding length of the photosensitive material sheet based on the scanning length. A projection optical system projects image light reflected from the original in the form of a slit onto the photosensitive material sheet; and scanning control means adjust a magnification of the projection optical system according to the reproduction magnification. Based on the scanning length and the feeding length, the scanning control means also control the feed of the photosensitive material sheet and of the original. The magnification of the projection optical system is adjusted prior to the reproduction of the image, and then the original and the photosensitive material sheet are synchronously fed while the slit image light is projected onto the photosensitive material sheet.

The present invention is also directed to a method of reproducing an image of an original onto a photosensitive material sheet. The method includes setting an original at a predetermined position; inputting a scanning length of a scanning region which includes an image to be reproduced, and a reproduction magnification of the image; and calculating a feeding length of the photosensitive material sheet based on the scanning length. The magnification of a projection optical system is adjusted prior to reproduction of the image according to the reproduction magnification. The projection optical system projects image light reflected from the original in the form of a slit onto the photosensitive material sheet. The method also includes the step of feeding synchronously the original and the photosensitive material sheet while the slit image light is projected onto the photosensitive material sheet.

The present invention is also directed to a camera for reproducing an image onto a photosensitive material sheet to thereby produce a side-mounted type printing plate, the side-mounted type printing plate having a holding space on a top or a bottom portion of the photosensitive material sheet. The camera includes an original feed means for feeding an original in an original feeding direction; photosensitive material feed means for feeding a photosensitive material sheet in a photosensitive material feeding direction; and means for inputting a width of the photosensitive material sheet, a width of a holding space and a reproduction magnification of an image to be reproduced. A projection optical system image light reflected from the original in the form of a slit onto the photosensitive material sheet. Computation means calculate positioning data of the Original with respect to a direction perpendicular to the original feeding direction, based on the width of the photosensitive material sheet, the width of the holding space and the reproduction magnification. A display is also included in the camera, for displaying the positioning data.

The present invention is also directed to a camera for reproducing an image onto a photosensitive material sheet to thereby produce a top-or-bottom-mounted type printing plate, the top-or-bottom-mounted type printing plate having a holding space on a leading edge portion of the photosensitive material sheet with respect to a photosensitive material feeding direction. The camera comprises an original feed means for feeding an original in an original feeding direction; photosensitive material feed means for feeding a photosensitive material sheet in the photosensitive material feeding direction; and means for inputting a width of a holding space. A projection optical system projects image light reflected from the original in the form of a slit onto the photosensitive sheet. Computations means calculate a length of the photosensitive material to be fed prior to reproduction of an image, based on the width of the holding space. A scanning control means for controls the feed of the photosensitive material sheet and of the original, such that the photosensitive material is fed by the calculated length prior to the reproduction of the image, and thereafter the original and the photosensitive material sheet are synchronously fed while the slit image light is projected onto the photosensitive material sheet.

The present invention is also directed to a photosensitive material feeding unit for feeding a photosensitive material in a photosensitive material feeding direction. The photosensitive material feeding unit comprises a motor rotatable in two opposite directions and a first and a second roller set for feeding the photosensitive material sheet. The first and the second roller set is placed in that order along the photosensitive material feeding direction. Power transmit means provide drive force from the motor to either of the first and the second roller set.

Accordingly, a first object of the present invention is to provide a scan-exposure camera which is capable of changing a reproduction magnification for each image.

A second object of &he present invention is to provide a scan-exposure camera which is capable of easily exposing a non-scanning region even when reproducing images at different magnifications.

A third object of the present invention is to provide a scan-exposure camera in which an original is easily mounted to an original holder in accordance with a mounting method and a reproduction magnification.

A fourth object of the present invention is to provide a photosensitive material feed unit which is capable of rewinding a photosensitive material in an easy manner even when employing a one-way clutch.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A, 3B and 3C are a front-sectional view, a bottom view and a right-side view of a supplementary light source, respectively;

FIG. 3D is a bottom view of another example of the supplementary light source;

A. Schematic Structure of the Apparatus

Figure 1:
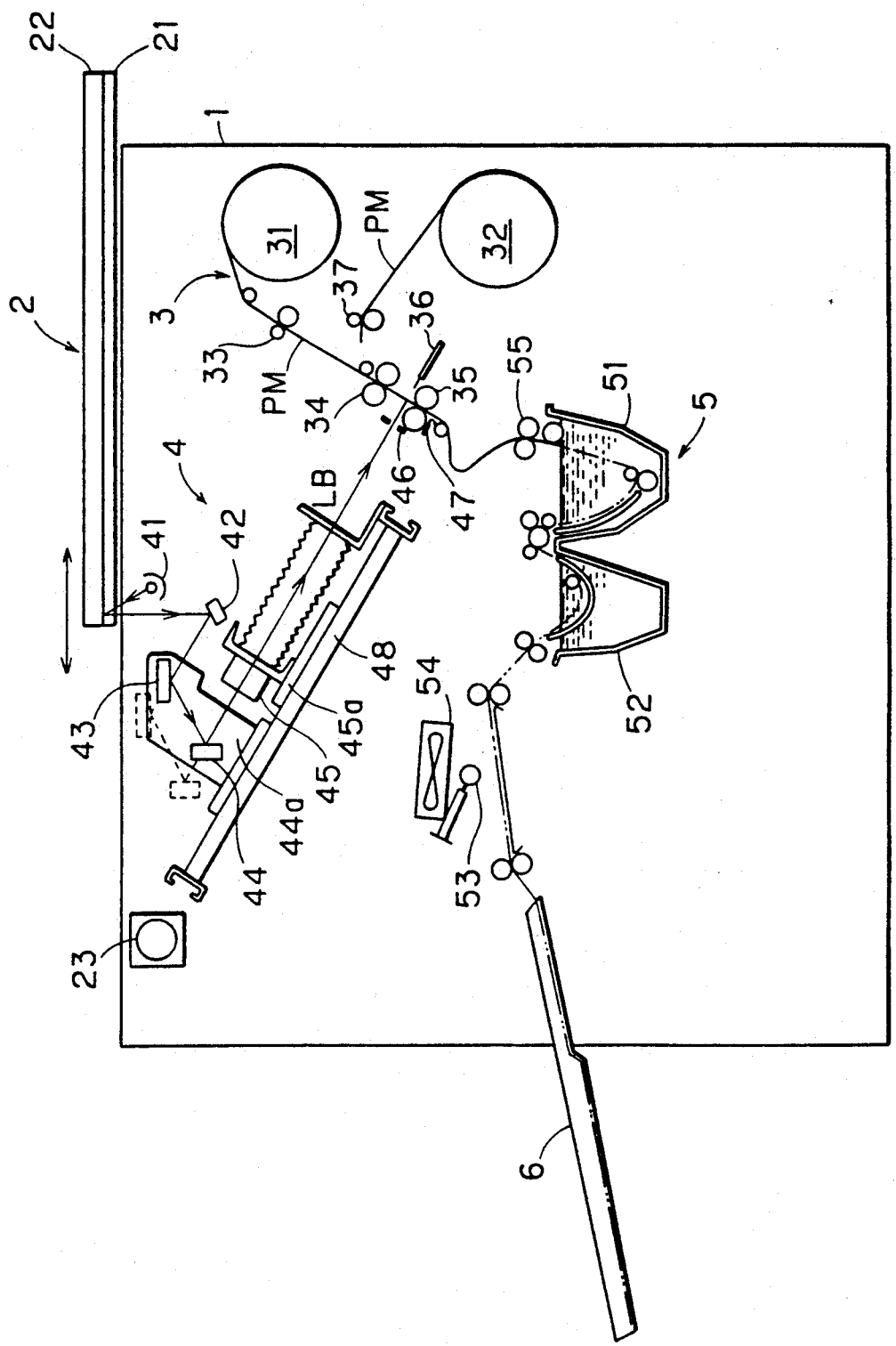
FIG. 1 is an essentially schematic sectional side elevation of a camera according to a first embodiment of the present invention.

FIG. 1 is an essentially schematic sectional side elevation of a camera according to a first embodiment of the present invention.

This camera is provided with an enclosure box 1, an original holder 2 mounted for horizontal movement atop the enclosure box 1, a photosensitive material feed unit 3 for feeding a photosensitive material PM to an exposure position, a projection optical system 4 for illuminating an original held in the original holder 2 and projecting a light beam reflected from the original onto the photosensitive material PM, and a development unit 5 for developing and fixing the exposed photosensitive material PM.

The original holder 2 is comprised of a platen 21 made of a transparent glass plate and a holder cover 22. Thus, an original is firmly held therebetween. When driven by a motor 23 mounted in the enclosure box, the original holder 2 moves horizontally (to the right-hand or the left-hand side in FIG. 1).

The photosensitive material feed unit 3 is provided with a first and a second photosensitive material rolls 31 and 32. The photosensitive material PM in the form of a sheet is drawn out either of the rolls 31 or 32, depending on demands. In the example of FIG. 1, the photosensitive material PM is drawn out of the first photosensitive material roll 31 and is fed by three roller sets 33 to 35. The exposure position is placed between the two roller sets 34 and 35. Behind the back surface of the photosensitive material PM which is in the exposure position, a cutter unit 36 is disposed to cut off the photosensitive material PM in a proper length. If, on the other hand, a plurality of images are reproduced onto a photosensitive material of the second roll 32 to form a printing plate, three roller sets 37, 34 and 35 cooperatively feed the photosensitive material PM from the roll 32. Detailed descriptions of the structures and the operations of the photosensitive material feed unit 3 will be provided later.

The projection optical system 4 includes a main light source 41 for emitting illumination light toward an original held in the original holder 2, mirrors 42 to 44 for reflecting a light beam reflected from the original, a projection lens 45 for directing the image light toward the photosensitive material PM, and a slit 46 for restricting a width of a light beam LB to be projected upon the photosensitive material PM. Below the roller set 35, a supplementary light source 47 is provided in order to generally expose edge portions of the photosensitive material PM. These edge portions, i.e., non-scanning regions, cannot be exposed with the projection light beam LB.

The camera is capable of changing a projection magnification by adjusting a magnification of the projection optical system 4. The mirrors 43 and 44 are secured to a support plate 44a. The support plate 44a slides on a slide stand 48 when driven by a motor (not shown). A support stand 45a of the projection lens 45 also slides on the slide stand 48 when driven by a motor (not shown). Thus, the magnification of the projection optical system 4 can be changed by moving the mirrors 43 and 44 and the projection lens 45 in parallel.

Image of an original can be reproduced by simultaneously feeding the original holder 2 to which the original has already been mounted and a photosensitive material PM while illuminating the original by the main light source 41. More precisely, while the original holder 2 slides t the left-hand side in the figure, the roller sets 33 to 35 feed the photosensitive material PM downward. A light beam LB from the original is sequentially reflected by the mirror 42, 43 and 44. Having passed through the projection lens 45 and the slit 46, the projection light beam LB converges onto the photosensitive material PM. Since the feed of the original holder 2 and the feed of the photosensitive material PM take place simultaneously, the image of the original are sequentially projected in the form of a slit onto the photosensitive material PM. After the exposure, the photosensitive material PM is cut off by the cutter unit 36, so that the exposed photosensitive material sheet is formed, and then is delivered to the development unit 5.

After arrival in the development unit 5, the exposed photosensitive material sheet PM is further fed by rollers along a feeding route shown by dash-dot-and-dot line of the figure thereby to be developed, fixed and then dried. More particularly, the photosensitive material sheet PM advances through a development tank 51 containing a developer, and thereafter through a fixing tank 52 containing a fixing solution. The photosensitive material PM further travels through a drying section in which a dry heater 53 and a fan 54 are provided, to be eventually discharged on a tray 6 which is provided outside the enclosure box 1. The photosensitive material sheet PM thus developed, fixed and dried can finally serve as a printing plate for offset printing.

Figure 2:
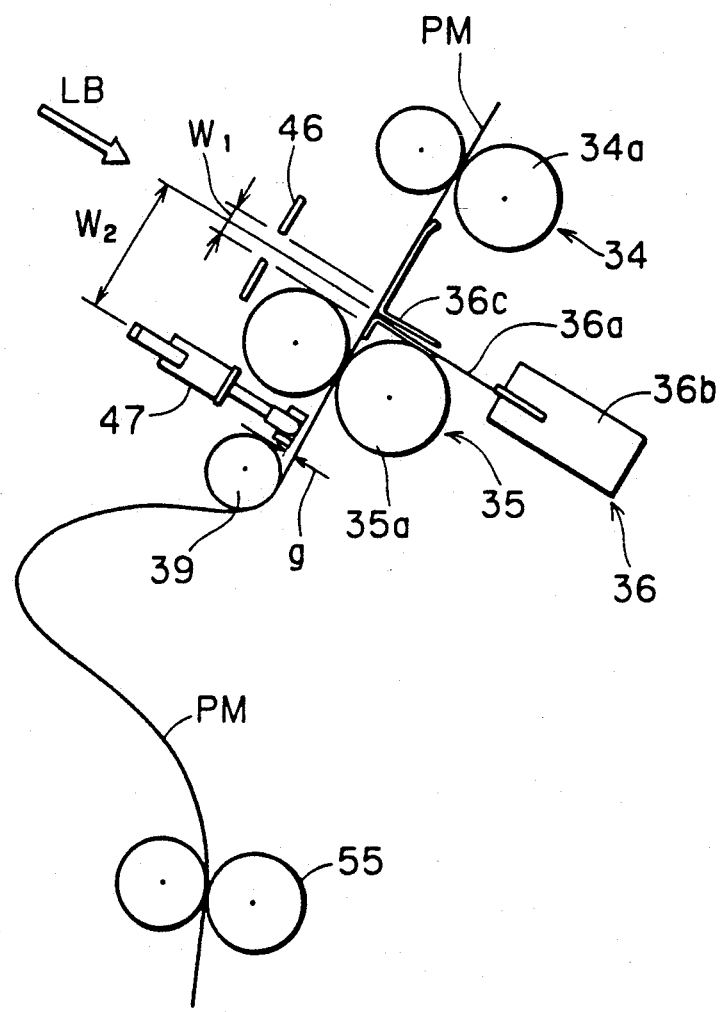
FIG. 2 is an enlarged side view of a photosensitive material feed unit.

FIG. 2 is an enlarged side view of the photosensitive material feed unit 3.

A drive roller 34a of the rollers 34 is connected to a one-way clatch (not shown), while a drive roller 35a of the rollers 35 is connected to an electromagnetic clutch (also not shown). At first, the roller set 34 holds the leading edge portion of the photosensitive material PM and starts feeding the photosensitive material PM in a downward direction. The photosensitive material PM is then held by the roller set 35 on its leading edge portion and starts to be fed by the same.

The roller set 35 feeds the photosensitive material PM faster than the roller set 34. Thus, the one-way clutch starts skidding once the roller set 35 starts feeding the photosensitive material PM. consequently enabling the photosensitive material PM to be fed at the feeding speed of the roller set 35. It is important to note here that since the roller set 34 retains its nipping power (i.e., holding power) even with the skidding of the one-way clutch, the photosensitive material PM keeps being fed while being in tension between the roller sets 34 and 35. Thus, the photosensitive material PM remains fully tense between the roller sets 34 and 35, prohibiting loosening from occuring. The projection light beam LB from &he original will be projected onto this photosensitive material PM, the width thereof being approximately the same as the width $W_1$ of the slit 46.

Once caught on the leading edge portion by a pair of processor rollers 55 of the development unit 5, the photosensitive material PM is to be fed downward by the roller sets 35 and 55. The feeding speed of the processor roller set 55 is slower than that of the roller set 35. This allows the photosensitive material PM to be loosened between the roller sets 35 and 55. During the cut off, the roller set 35 stops rotating whereas the processor roller set 55 keeps rotating. However, since the photosensitive material PM is loosening between the roller sets 35 and 55, the photosensitive material PM remains still in a cut off position until it loses its loosening. Hence, although the leading edge portion of the photosensitive material PM is fed by the roller set 55, the photosensitive material PM can be cut off straight. In more detail, the cut off position where the cutter unit 36 cuts off the photosensitive material PM coincides with an approximately center of the area upon which the projection light beam LB impinges. The cutter unit 36 of FIG. 2 comprises a cutter blade 36a, a blade fixer 36b and a blade guide 36c. The cutter blade 36a cuts off the photosensitive material PM as it moves along the blade guide 36c, i.e., in a direction vertical to the drawing sheet.

FIGS. 3A, 3B and 3C are a front-sectional view, a bottom view and a right-side view of the supplementary light source 47, respectively. The supplementary light source 47 includes a plurality of LEDs 47a (light source element) arranged in a line at intervals of a preselected pitch P, and a flare prevention member 47b provided under the LEDs 47a. The flare prevention member 47b has a plurality of holes 47c each of which corresponds to the bottom of a LED 47a. As seen in FIG. 3B, each hole 47c is formed into a rectangle, for example. Symbols E and F are the length and the width of the rectangle, respectively. If giving specific dimensions, the pitch P may be around 10 mm, the length E around 7 mm, and the width F around 2 mm. Such a flare prevention member 47c can be made of a light-blocking material. A light-blocking material is shaped by a machine or a plurality of plates made of the above material are, assembled, whereby the flare prevention member 47c is formed. The distance g between the supplementary light source 47 and the photosensitive material PM is 2 to 3 mm (see FIG. 2). A free roller 39 is provided beneath the supplementary light source 47 so that the distance g is constant. The length of the hole 47c is smaller than the pitch P: still, this would not cause light beams projected onto the photosensitive material PM through the holes 47c to excessively overlap one another, but would allow the light beams to uniformly expose the photosensitive material PM. Further, giving such a small value to the width F of the hole 47c obviates flare which occurs in the photosensitive material feeding direction. This clarifies a boundary line between scanning regions to be exposed with the projection light beam LB and non-scanning regions to be exposed by the supplementary light source 47, thus offering the novel camera an advantage.

The configuration of the hole 47c may be an oval as shown in FIG. 3D. In addition, since it is often required to turn on only some of the LEDs 47a from the both ends of the line of the LEDs (will be described later), the configuration of the hole 47c corresponding to the LED 47a not to turn on may be a circular. This provides another advantage that the flare prevention member 47b can be easily fabricated. Additionally, this does not sacrifice the flare prevention function.

Figure 4:
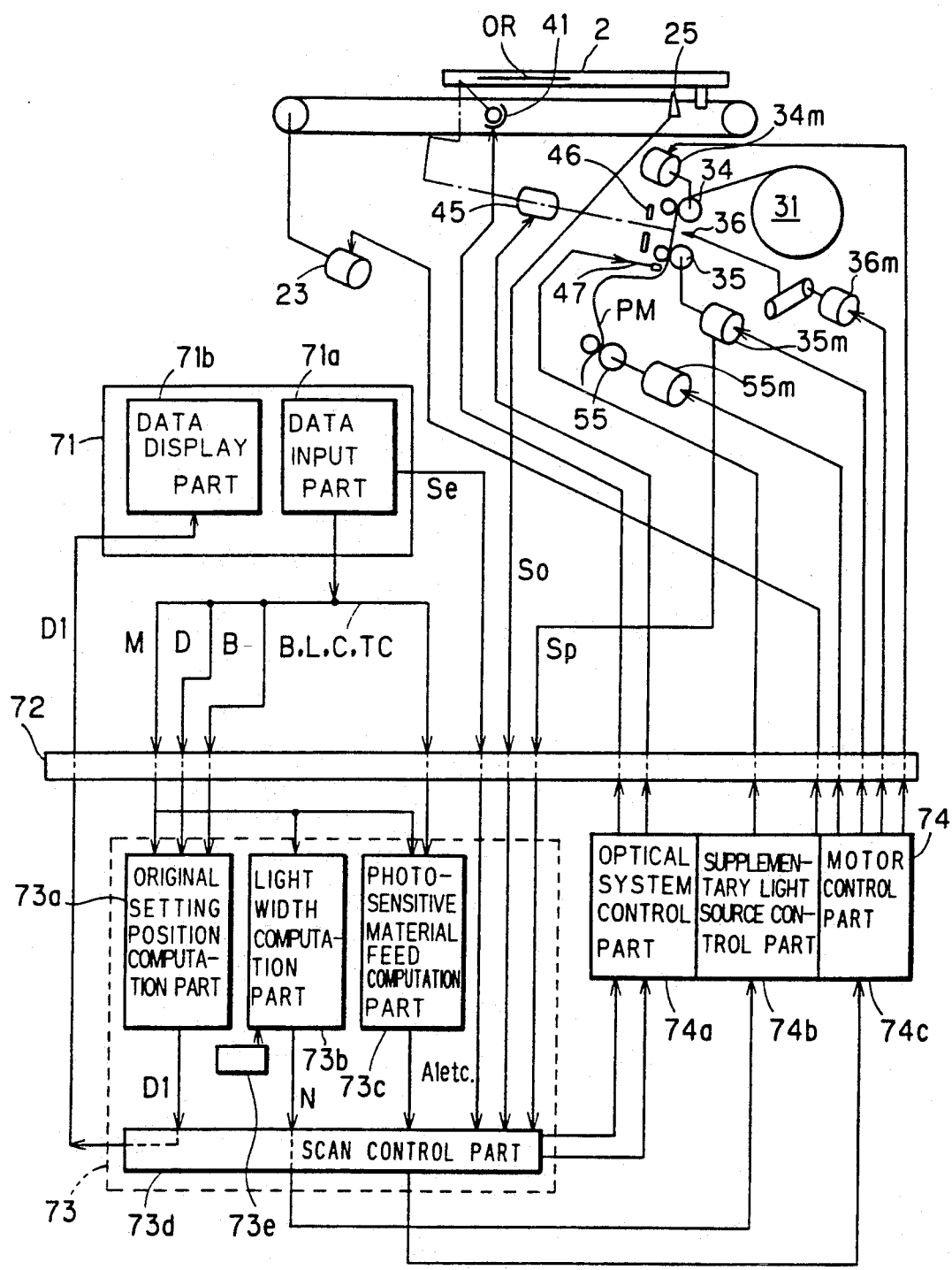
FIG. 4 shows the electrical structures of the camera.

FIG. 4 shows the electrical structures of the scan-exposure camera. In FIG. 4, a control unit& of this scan-exposure camera comprises a data input/display unit 71, an input/output interface 72, a CPU 73 and a power control unit 74.

The data input/display unit 71 is provided with a data input part 71a and a data display part 71b. Through the data input part 71a, which includes a number key and the like, the operator enters various data which will be described later. The data display part 71b displays data such as a position in which an original must be set on the original holder 2 so that the operator can read the original.

The CPU 73 is provided with a computation part 73a for calculating an original setting position, a lighting width computation part 73b, a photosensitive material feed computation part 73c, a scan control part 73d and a LED lighting data memory 73e. Software applied to the CPU 73 operates these parts.

B. First Embodiment

Figure 5:
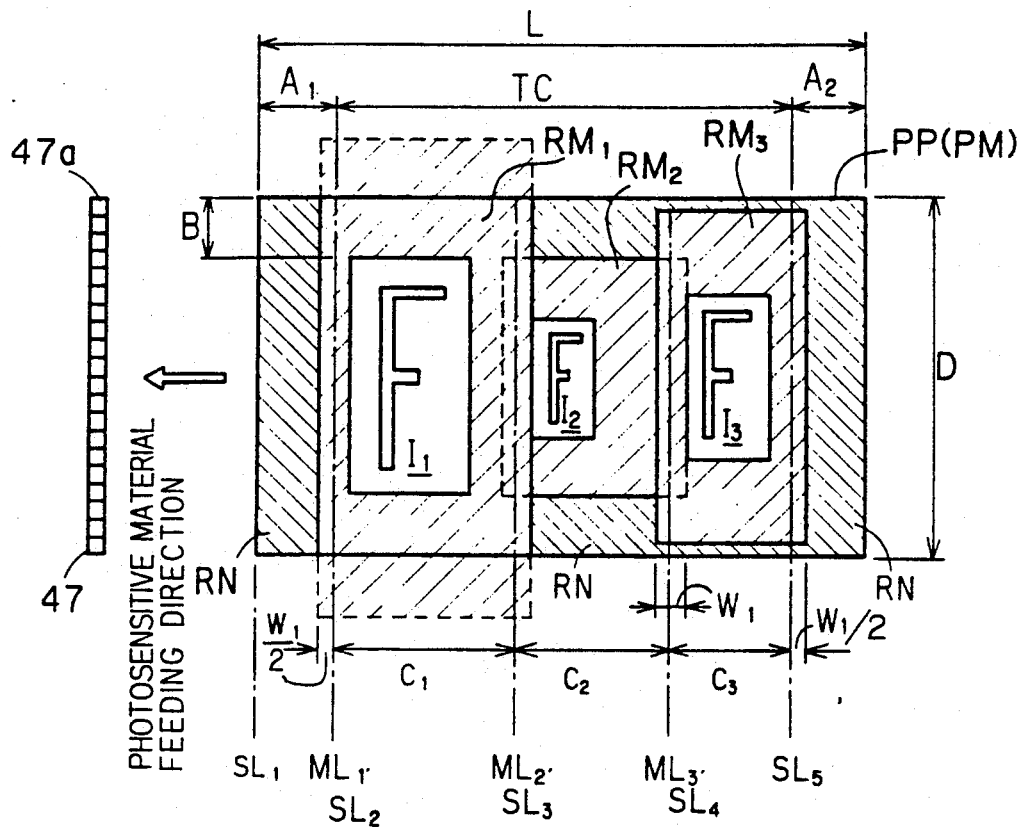
FIG. 5 is a plan view of a printing plate with images reproduced thereon.

FIG. 5 is a plan view of a printing plate PP which is produced by exposing the photosensitive material PM. The printing plate PP with a width of D is cut off in a length L, and has three reproduced images $I_1$ to $I_3$. The magnifications of the images $I_1$, $I_2$ and $I_3$ are 100%, 50% and 70%, respectively. Regions $RM_1$ to $RM_3$ around the images $I_1$ to $I_3$, each of which is shadowed lighter with oblique lines, are regions which are exposed with the projection light beam LB. The magnification of the image $I_1$ is 100%. Thus, a scanning region $RM_1$ with respect to the image $I_1$ has a width greater than the width D of the photosensitive material PM. On the other hand, regions other than the image $I_1$ to $I_3$ and other than the scanning regions $RM_1$ to $RM_3$ are non-scanning regions RN. The non-scanning regions are shadowed darker with oblique lines in the figure. Further, the printing plate PP of the first embodiment is of the top-or-bottom-mounted type, so as to have a holding space which is fixed onto a printer. The holding space of the printing plate PP is taken with a preset width B along the entire top edge of the printing plate PP. The images $I_1$ to $I_3$ are arranged so that the images and the holding space do not overlap each other.

In producing the printing plate PP of FIG. 5, the operator first provides the data input part 71a with the following values:

a) Reproduction Magnifications $M_1$, $M_2$ and $M_3$ of images $I_1$, $I_2$ and $I_3$;
b) width D of photosensitive material;
c) width B of holding space;
d) feeding length L;
e) scanning lengths $C_1$, $C_2$ and $C_3$ of scanning regions $RM_1$, $RM_2$ and $RM_3$ of images $I_1$, $I_2$ and $I_3$; and
f) total scanning length $TC = C_1 + C_2 + C_3$.

Then, the computation part 73a calculates an original setting position, namely, a value D1 (see FIG. 6), based on the magnifications $M_1$ to $M_3$, the photosensitive material width D and the width B of the holding space. The original setting position data D1 gives a position where the original is to be set on the platen 21.

Figure 6:
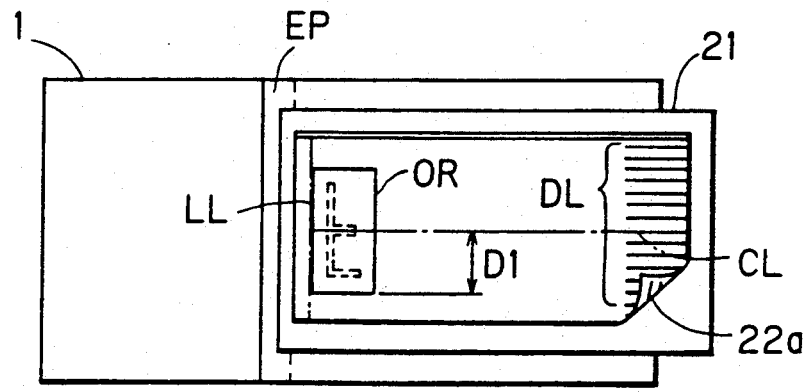
FIG. 6 is a plan view of an original being set on a platen.

FIG. 6 is a plan view of the original OR being set on the platen 21. The three images $I_1$ to $I_3$ will be reproduced from this single original OR, each at different magnifications. The original OR is placed with its surface-to-be-scanned down on the platen 21 which is made of a transparent glass plate. One edge of a positioning sheet 22a is fixed to the platen 21, the positioning sheet 22a being semi-transparent or transparent. The operator covers the original OR with this positioning sheet 22a. The positioning sheet 22a has a center line CL, a left reference line LL, and distance lines DL which indicate the distance from the center line CL toward the top or the bottom edge. In FIG. 6, the positioning sheet 22a is only partly lined with the distance lines DL. However, this is merely for illustration convenience; the positioning sheet 22a has the distance lines DL drawn on its entire surface. Since FIG. 6 is illustrating the scan-exposure camera as it has not begun image reproduction, the left reference line LL is right to an exposure part EP, the exposure part EP being illuminated by the main light source 41. The photosensitive material is exposed with the light beam reflected from the original as the platen 21 slides to the left side of FIG. 6.

The original setting position data D1, which gives the distance between the center line CL and the bottom edge of the original OR, is obtained as:

$$D1 = (D/2 - B)/M_{max} \qquad (1)$$

where $M_{max}$ is the maximum of the magnifications $M_1$ to $M_3$.

The original positioning data D1 is entered in the data display part 71b from the computation part 73a through the scan control part 73d and the input/output interface 72, and then is displayed at the data display part 71b. Thereafter, the operator sets the original OR on the platen 21 based on the original setting position data D1. The left edge of the original OR must be precisely on the left reference line LL in this stage.

Then, the lighting width computation part 73b determines the lighting width of the supplementary light source 47 based on lighting data fetched from the LED lighting data memory 73e and a reproduction magnification M. FIG. 5 also shows relations between the supplementary light source 47 and the photosensitive material PM (which will serve as a printing plate PP after exposed). The supplementary light source 47 includes a number of the LEDs 47a lined straight along the top-and-bottom direction. The lighting width computation part 73b determines how many LEDs 47a must be turned on from each end of the line of the LEDs in order to expose the non-scanning regions RN.

Figure 7:
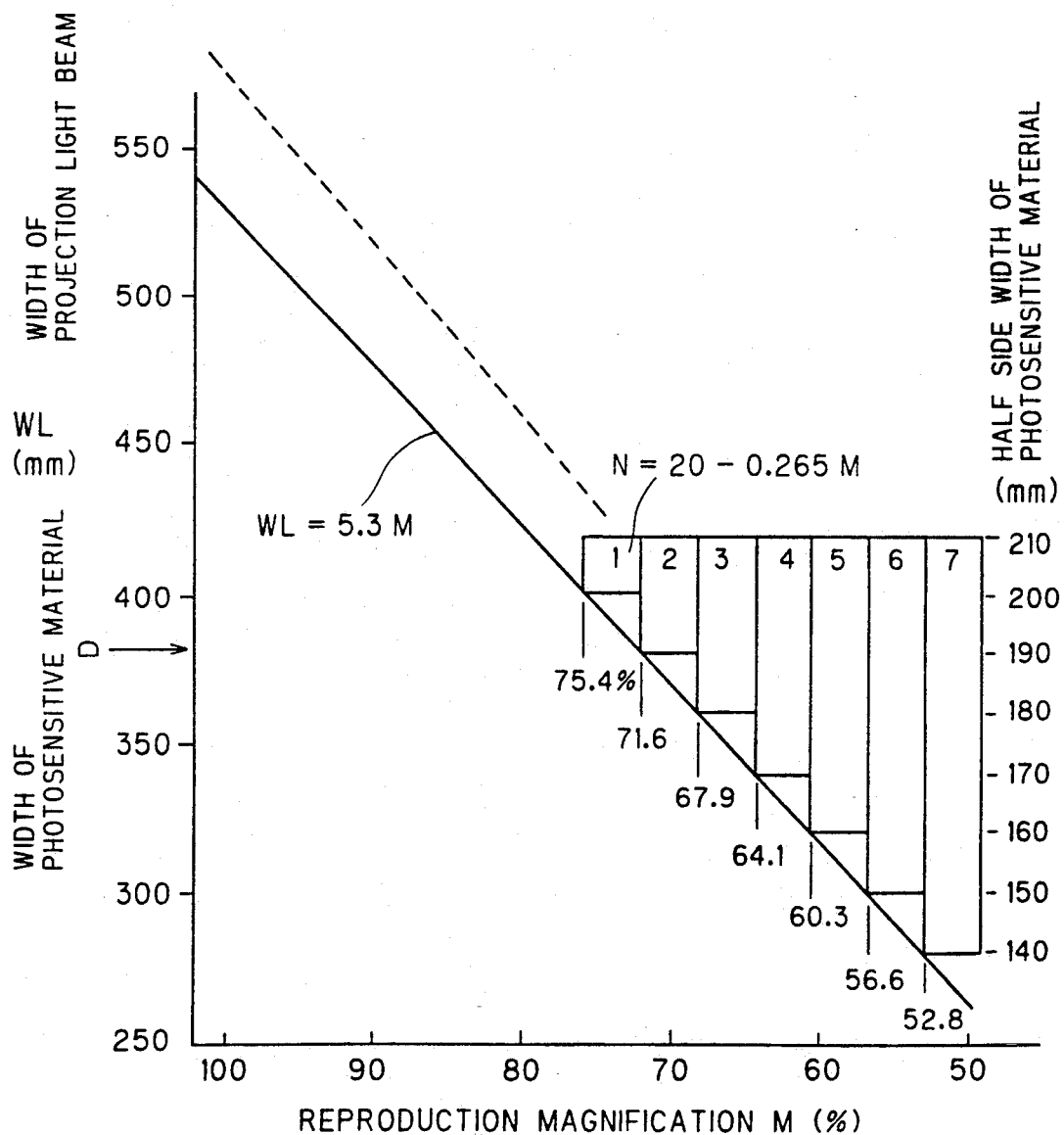
FIG. 7 is a graph for determining lighting width of the supplementary light source.

FIG. 7 is a graph for determining the number of the LEDs 47a to be turned on. In the figure, a reproduction magnification M is measured along the axis of abscissa. The axis of ordinate represents the width WL of the projection light beam LB upon the photosensitive material PM. The projection light beam width WL is in proportion to a reproduction magnification M (%), and is expressed as below:

$$WL = 5.3M \text{ (mm)} \tag{2}$$

According to the equation (2), the projection light beam width WL is 530 mm when a reproduction magnification M is 100%. Numerals provided in the right-most part of the figure are representative of half a width of a scanning area of the projection light beam LB, i.e., a scan area width in a half side of the photosensitive material PM. It is to be noted, here in the figure, that the photosensitive material width D is 420 mm. The bar graph part of FIG. 7 shows relations between a value N representing the number of the LEDs 47a to be turned on from each end of the line of the LEDs and a range of a reproduction magnification M which corresponds to the value N. For example, if a reproduction magnification M is 75.4%, the projection light beam width WL is 400 mm. Considering only a half side of the photosensitive material PM, since the photosensitive material width D is 420 mm, scan area of the projection light beam LB is the area 10 mm inside from the edges of the photosensitive material PM. Hence, when a reproduction magnification M is less than 75.4%, one LED 47a needs to be turned on from each end of the line of the LEDs 47a. It is noted here that in the supplementary light source 47 the pitch of the LED 47a is 10 mm. In addition, though in FIG. 7 an actual value of the projection light beam width WL is available from the broken line, a value which the solid line gives must be employed so that non-scanning regions in the edge portions of the photosensitive material PM are generally exposed by the supplementary light source 47. Calculating in a manner as described above, a value N representing the number of the LEDs 47a to be turned on is obtained as:

$$N = (400 - 5.3M)/(2 \times 10) \tag{3}$$
$$= 20 - 0.265M$$

If an obtained value has a decimal, the decimal must be raised to a unit. If an obtained value has a negative value, a value N is determined as zero. Turning now to the LED lighting data memory 73e, the LED lighting data memory 73e stores data expressing the relations, as found from the equation (3), between a reproduction magnification M and a value N, the data being given in Table 1.

TABLE 1

| Magnification M (%) | Value N for Half Side |
| --- | --- |
| 105–75.5 | 0 |
| 75.4–71.7 | 1 |
| 71.6–68.0 | 2 |
| 67.9–64.2 | 3 |
| 64.1–60.4 | 4 |
| 60.3–56.7 | 5 |
| 56.6–52.9 | 6 |
| 52.8–50.0 | 7 |

In the example of FIG. 5, the reproduction magnifications $M_1$, $M_2$ and $M_3$ of the three images $I_1$, $I_2$ and $I_3$ are 100%, 50%, and 70%, respectively. Provided with the reproduction magnifications $M_1$, $M_2$ and $M_3$, the equation (3) yields a value N for each of the images $I_1$ to $I_3$. The LEDs 47a are tuned on according to the obtained values N in order to expose the non-scanning regions RN beside the images $I_1$ to $I_3$ (in the figure, on the top and the bottom portion).

In general, the following equation (4) is employed to calculate a value N:

$$N = (D - 2P \cdot WL_O \times M/100)/2P \tag{4}$$

where
D: width of photosensitive material
P: pitch Of LED 47a
$WL_O$: projection light beam width under reproduction magnification M of 100%
In the equation (4), a value D of the photosensitive material width may be of a width of a widest possible photosensitive material employable within the scan-exposure camera.

Then, the value N thus calculated in the lighting width computation part 73b is entered in the scan control part 73d.

On the other hand, the photosensitive material feed computation part 73c calculates the distance which the photosensitive material PM is to be fed by the roller sets 34 and 35, based on a reproduction magnification M ($M_1$ to $M_3$), a holding space width B, a photosensitive material feeding length L, a scanning length C ($C_1$ to $C_3$) and a total scanning length TC. In the example of FIG. 5, the computation part 73c calculates a length $A_1$ of the non-scanning region in the leading edge portion and a length $A_2$ of the non-scanning region in the rear edge portion. The length $A_1$ is the distance which the photosensitive material PM must be fed prior to the feed of the original holder 2. If the original holder 2 starts moving and the light beam is emitted toward the holder 2 after the photosensitive material PM has been fed by the length $A_1$, the image $I_1$ will be reproduced as shown in FIG. 5. Noting that the length $A_1$ and the length $A_2$ are usually equal in a printing plate of the top-or-bottom-mounted type, the two values $A_1$ and $A_2$ can be obtained as:

$$A_1 = A_2 = (L-TC)/2 \qquad (5)$$

The values $A_1$ and $A_2$ calculated in the photosensitive material feed computation part 73c will be then given, together with scanning lengths $C_1$ to $C_3$, to the scan control part 73d.

Aside from data such as a value N, i.e., the number of the LEDs 47a to be turned on, and values $A_1$ and $A_2$, the photosensitive material feed computation part 73c receives a scan start signal $S_e$ from the data input part 71a. In addition to this, the computation part 73c receives an initial position signal $S_O$ from an original initial position sensor 25 mounted beneath the original holder 2, as well as a photosensitive material feed pulse signal $S_p$ from an encoder (not shown) installed in a drive motor 35m for the roller set 35. The scan control part 73d, based on those data and signals mentioned above, gives instructions to an optical system control part 74a, a supplementary light source control part 74b and to a motor control part 74c, which are installed in the power control unit 74. Thus, the scan control part 73d controls scan and reproduction.

The optical system control part 74a turns the main light source 41 on-off through the input/output interface 72. The control part 74a also adjusts a magnification of the projection optical system 4. The supplementary light source control part 74b, on the other hand, turns the LEDs 47a on-off through the input/output interface 72 so that the number of the LEDs 47a to be turned on coincides with the value N. The motor control part 74c, similarly through the input/output interface 72, controls operations of drive motors 34m, 35m and 55m for the rollers 34, 35 and 36, respectively. In addition, the motor control part 74c controls operations of a drive motor 36m for the cutter unit 36.

Figure 8A:
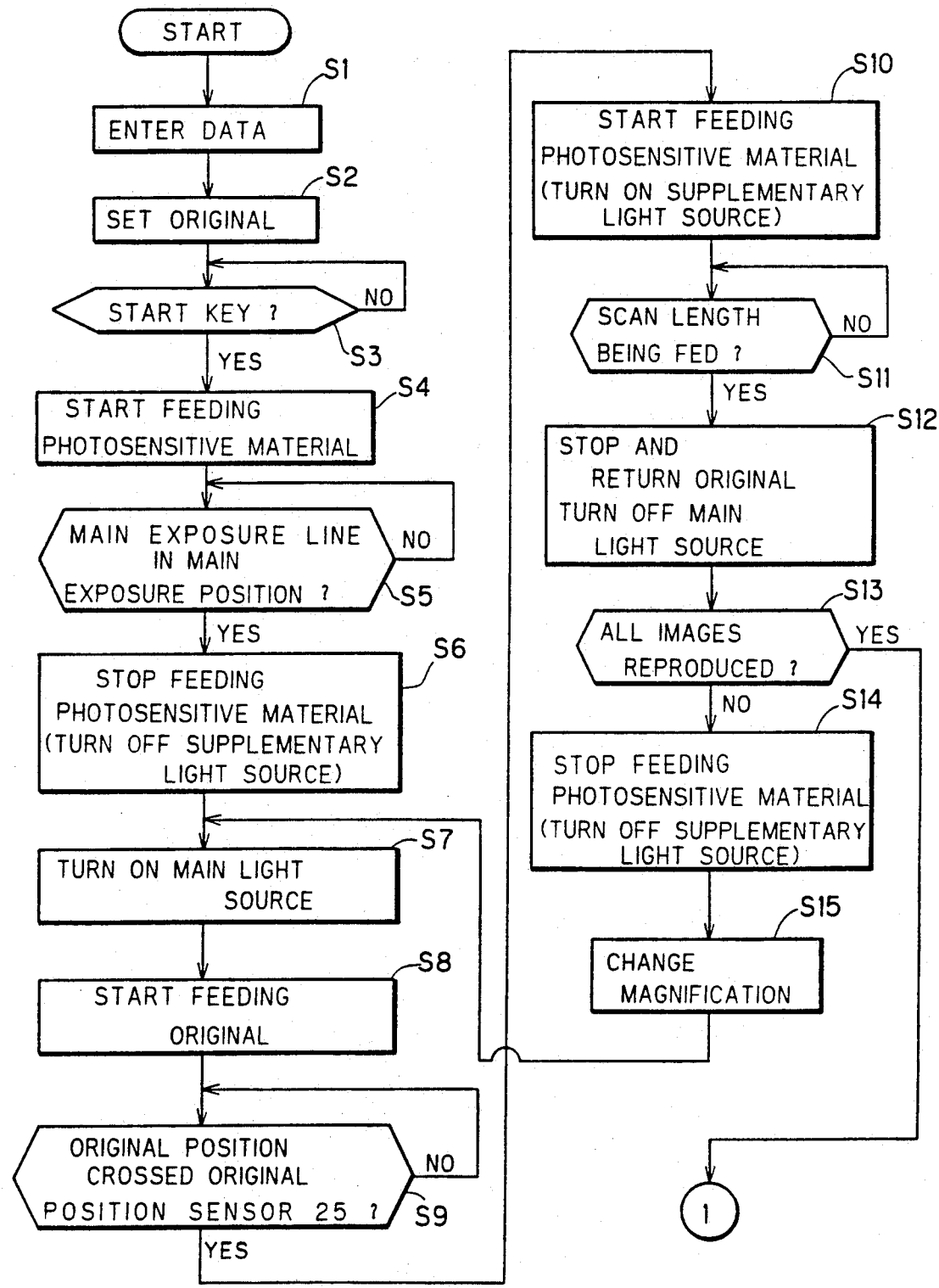
FIGS. 8A to 8C are flowcharts showing the procedures of reproduction according to the first embodiment.
Figure 8B:
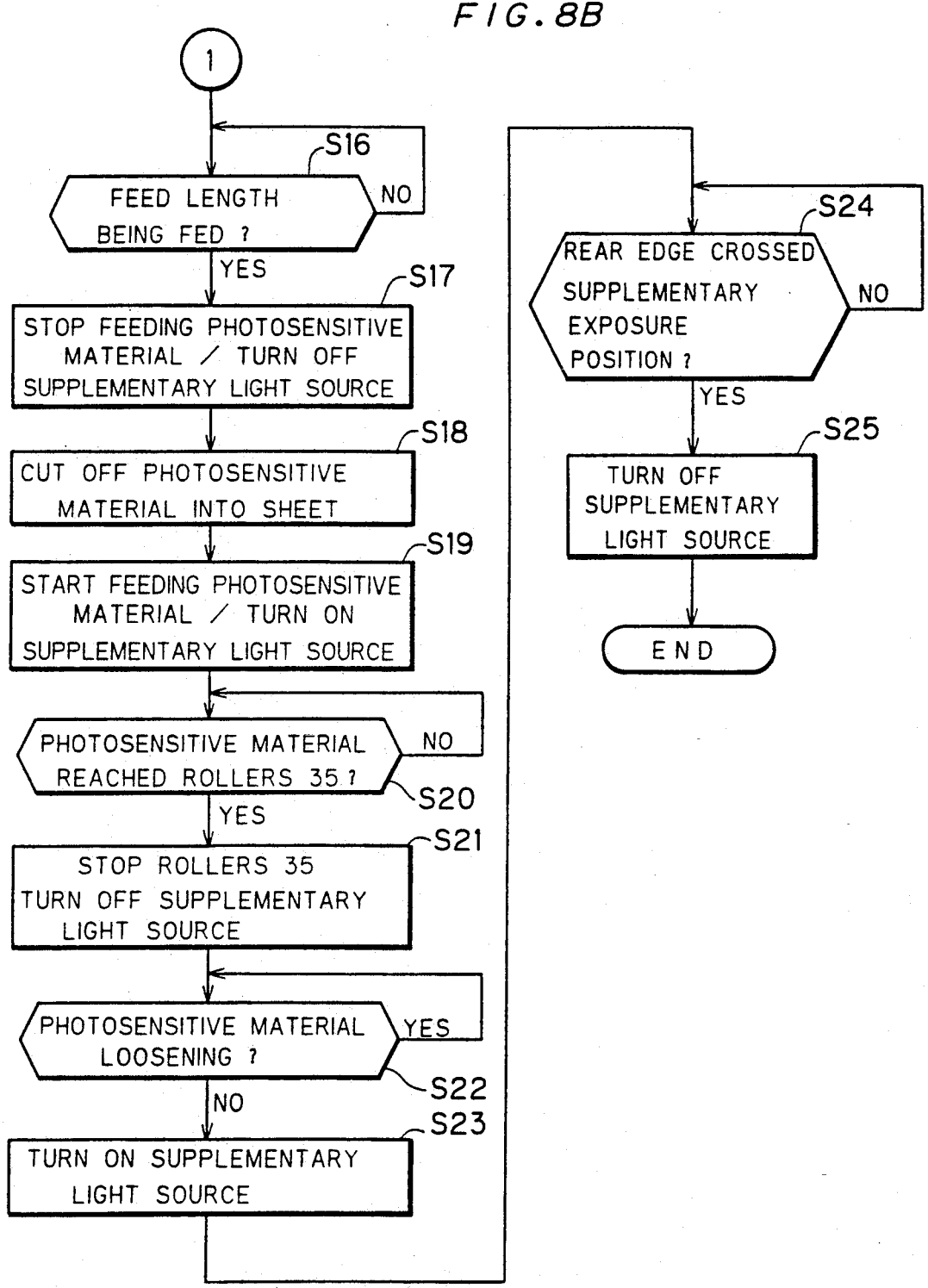
Figure 8C:
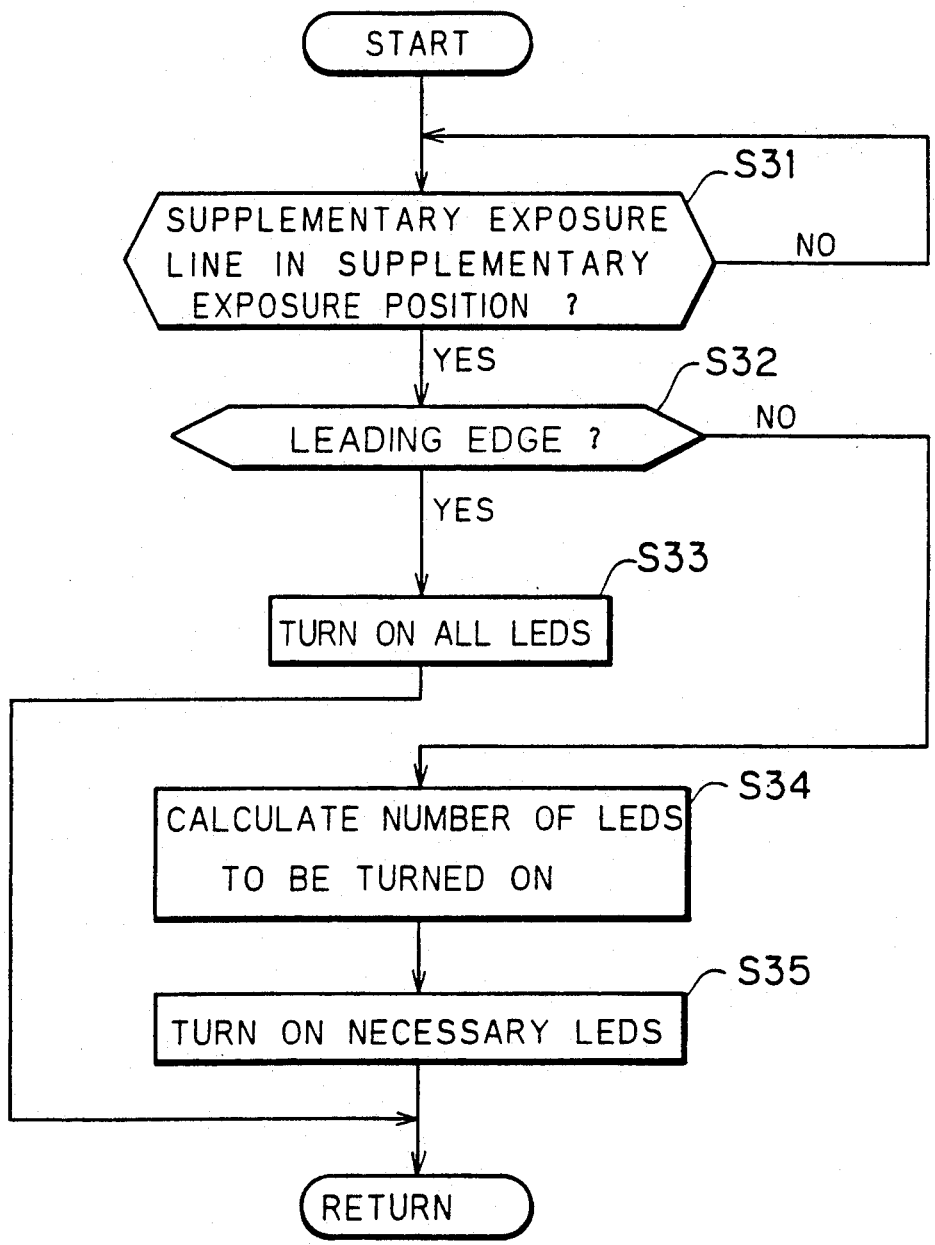

FIGS. 8A to 8C are flowcharts showing the procedures of the production of the printing plate of FIG. 5. FIGS. 9A through 9L are explanatory diagrams of exposure conditions of a photosensitive material PM.

Figure 9A:
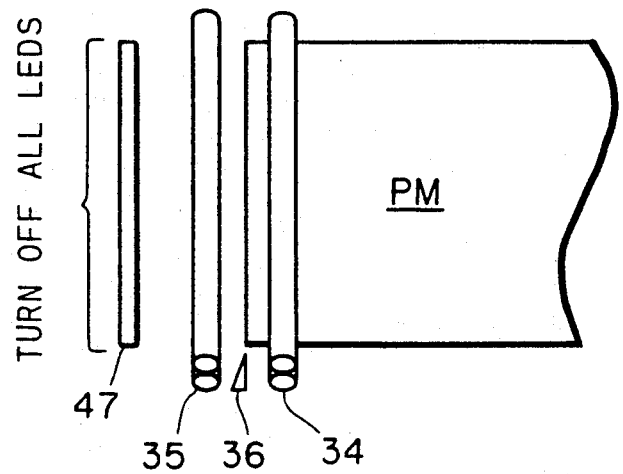
FIGS. 9A through 9L are explanatory diagrams of exposure conditions of a photosensitive material.

First, in Step S1, the operator provides the data input part 71a with necessary data, namely, reproduction magnifications $M_1$, $M_2$ and $M_3$, a photosensitive material width D, a holding space width B, a photosensitive material feeding length L, scanning lengths $C_1$, $C_2$ and $C_3$ and a total scanning length TC. At the same time the operator specifies a mode indicative of a type of a printing plate, i.e., whether a demanded printing plate is a top-or-bottom-mounted type or a side-mounted type. As shown in FIG. 9A, the leading edge of the photosensitive material PM is in the cut off position of the cutter unit 36. The cut off position coincides with the center of the projection light beam LB in the first embodiment. This position will be hereinafter referred to as a "main exposure position," whereas the exposure position of the supplementary light source 47 will be referred to as a "supplementary light source position."

If a demanded printing plate is a top-or-bottom-mounted type, the computation part 73a calculates the original setting position data D1 according to the equation (1). Thereafter, the position data D1 is displayed in the data display part 71b. The operator reads the displayed data D1 and then mounts the original OR in the position shown in FIG. 6 (Step S2).

The operator taps a start key of the data input part 71a to start off the operations of the remaining steps (Step S3).

The photosensitive material feed computation part 73c calculates according to the equation (5) the values $A_1$ and $A_2$ for the non-scanning regions. The rollers start feeding the photosensitive material PM in accordance with these values (Step S4).

Whether a main exposure line is in the main exposure position or not is judged in Step S5. The term "main exposure line" refers to each of the lines $ML_1$, $ML_2$, and $ML_3$ (dashed-and-dotted lines of FIG. 5) at the left ends of the arrows showing the scanning lengths $C_1$, $C_2$, and $C_3$. The leading edge of the photosensitive material PM (left-most line) is a supplementary exposure line $SL_1$. The above-said main exposure lines $ML_1$, $ML_2$ and $ML_3$ are supplementary exposure lines $SL_2$, $SL_3$ and $SL_4$, respectively. A supplementary exposure line $SL_5$ is the line at the right end of the arrow which shows the scanning length $C_3$.

Figure 9B:
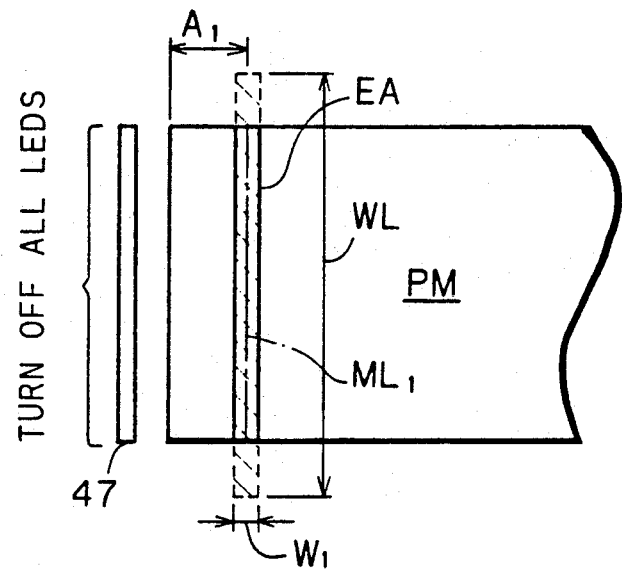

As shown in FIG. 9B, the roller set 35 feeds the photosensitive material PM by the length $A_1$, namely, the length of the non-scanning region in the leading edge portion, consequently bringing a first main exposure line $ML_1$ to the main exposure position. Then, the roller set 35 stops rotating, which in turn stops the feed of the photosensitive material PM (Step S6). In Step S7, the main light source 41 is turned on. The feeding length of the photosensitive material PM is calculated in the scan control part 73d based on a photosensitive material feed pulse signal $S_p$ derived from the encoder (not shown) of the motor 35m for the roller set 35 (FIG. 3). In each Steps S11, S16, S20, S22 and S31 (described below), the length of the photosensitive material PM fed by the rollers 35 is obtained similarly to the above, and then the prescribed judgement is carried out.

In FIG. 9B, an exposure area EA is indicated, which is exposed with the projection light beam LB from the main light source 41. The exposure area EA is rectangular, a shorter line thereof being equal to a slit width $W_1$, a longer line thereof being equal to the projection light beam width WL which is obtained from the equation (2). It is appreciated that the main light source 41 may be turned on a little earlier than the rollers stop feeding the photosensitive material PM in Step S6.

Next, the original holder 2 starts moving to the left from its waiting position of FIG. 4 (Step S8). When the original initial position sensor 25 detects that a predetermined original initial position of the original holder 2 has crossed the same (Step S9), the rollers once again start feeding the photosensitive material PM (Step S10). In this stage, the projection light beam LB reflected from the original OR just below the left reference line LL (see FIG. 6) impinges upon the photosensitive material PM in the main exposure position, which is in the center of the exposure area EA. Thus, the image $I_1$ is reproduced on the photosensitive material PM as the photosensitive material PM and the original OR are fed synchronously.

Figure 9C:
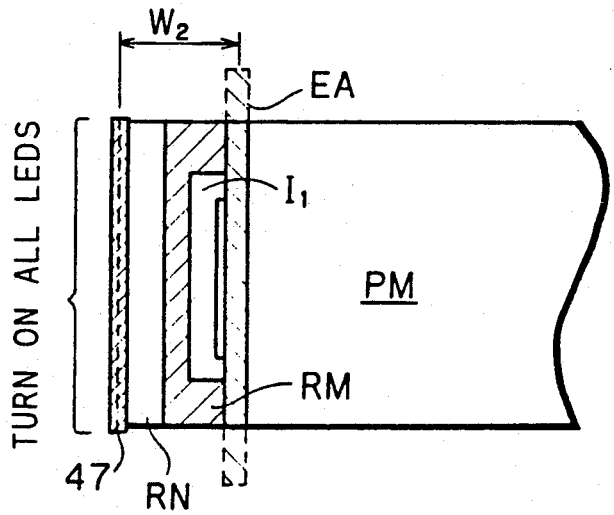
Figure 9D:
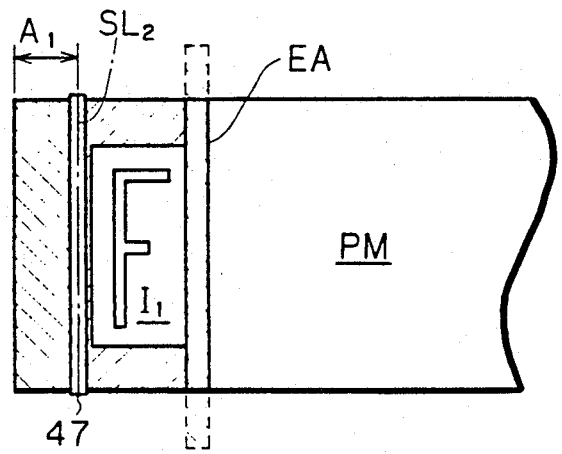

The photosensitive material PM is further fed until the leading edge thereof (the first supplementary exposure line $SL_1$) reaches the supplementary exposure position (see FIG. 9C). When the leading edge reaches the supplementary exposure position, every LED of the supplementary light source 47 will be turned on. Turning the supplementary light source 47 on-off is constantly governed as described in Step S31 through Step S35 in this embodiment. Steps S31 to S35 are repeated as a set of operations on every arrival of any one of the supplementary exposure lines $SL_1$ to $SL_5$ at the supplementary exposure position, thus allowing only required LEDs to be turned on from the both ends of the supplementary light source 47. In carrying out the set of steps, the supplementary light source 47 may be turned on a little earlier than a supplementary exposure line reaches the supplementary exposure position. If the rollers stop feeding the photosensitive material PM while the supplementary light source 47 is turning on (Step S6, for example), the supplementary light source 47 will be temporarily turned off. Thereafter, the rollers start feeding the photosensitive material PM again (Step S10, for example), and in response to this, the supplementary light source 47 will be turned on once again. This is necessary because flare will easily occur if the supplementary light source 47 is left turned on when the photosensitive material PM is not moving.

In this embodiment, the distance $W_2$ between the main exposure position and the supplementary light source position is not shorter than the length $A_1$ of the non-scanning region in the leading edge portion (see FIG. 9C). Therefore, the main light source 41 will have already exposed a part of the area which includes both the image $I_1$ and the scanning region RM around the image $I_1$ by the time the supplementary light source 47 starts to expose the non-scanning regions RN. If, unlike the present example, the value $W_2$ is smaller than the value $A_1$, the exposure of the non-scanning regions by the supplementary light source 47 begins earlier than the exposure by the main light source 41.

The photosensitive material PM is further fed from the position in FIG. 9C. Then, a second supplementary exposure line $SL_2$ reaches the supplementary light source position (FIG. 9D), and Steps S31 to S35 will be carried out. Here again, since the reproduction magnification $M_1$ of the image $I_1$ is 100%, the number of the LEDs to be turned on is zero. Hence, the supplementary light source 47 would not be turned on in actual operations. The conditions of FIGS. 9C and 9D take place between Step S10 of FIG. 8A (i.e., the condition of FIG. 9B) and the subsequent stage.

Figure 9E:
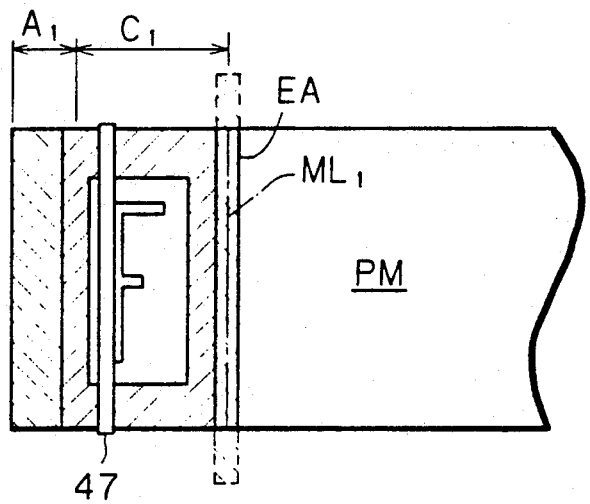

In Step S11, whether the photosensitive material PM has advanced the scanning length $C_1$ or not is determined by calculating the total distance the photosensitive material PM has been fed from Step S4. If it is determined that the photosensitive material PM has advanced the length $C_1$, the original holder 2 stops to be fed and is returned to its waiting position (Step 12). The reproduction of the images $I_2$ to $I_3$ has not yet finished in this stage. This requires the photosensitive material PM to be stopped during proceeding from Step S13 to Step S14 (FIG. 9E). In production of the printing plate PP of FIG. 5, the supplementary light source 47 has already been turned off prior to Step S14 and needs not to be turned off in this step.

Figure 9F:
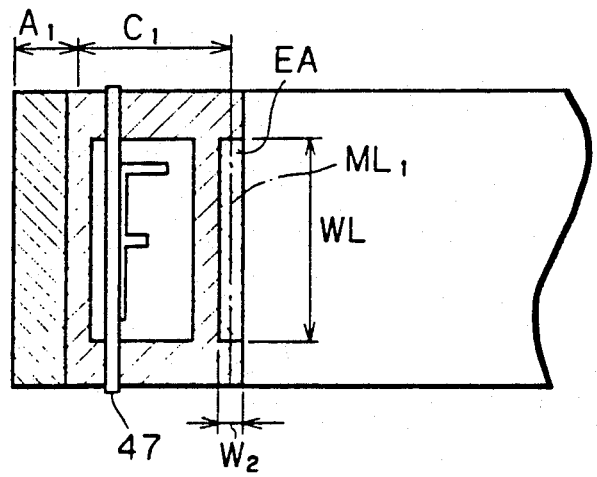
Figure 9G:
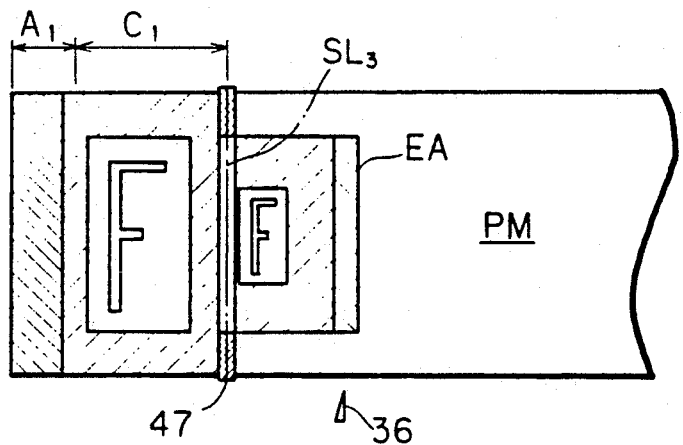

Next, in Step S15, the projection optical system 4 is adjusted so that the image $I_2$ will be reproduced at the desired magnification $M_2$. Then, Step S7 and the subsequent steps are carried out once again. In Step S7, the main light source 41 is turned on again as shown in FIG. 9F. Since the reproduction magnification $M_2$ of the second image $I_2$ is 50%, the width WL of the exposure area EA is shorter than the width D of the photosensitive material PM as found from the equation (2). In Step S10 and the following steps, the projection light beam LB with a width of WL will scan the area for the image $I_2$ and the accompanying scanning region.

The rollers start feeding the photosensitive material PM in Step S10. When a third supplementary exposure line $SL_3$ reaches the supplementary light source position, Steps S31 to S35 are carried out. Thus, the required LEDs 47a are turned on from both ends of the line of the LEDs. This enables the edge portions of the photosensitive material PM, which cannot be exposed with the projection light beam LB, to be fully exposed.

Figure 9H:
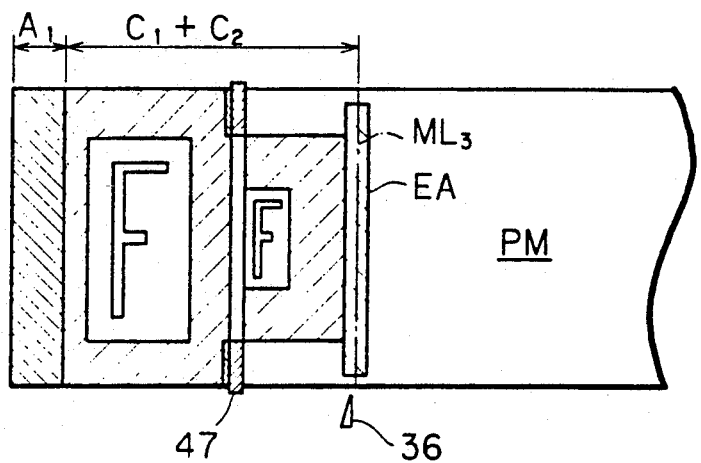

Then, the photosensitive material PM is further fed until the third supplementary exposure line $SL_3$ reaches the main exposure position (FIG. 9H). In response to this, Steps S11 to S15 are executed, so that a reproduction magnification is changed. Then, Step S7 and the subsequent steps are executed once again.

Figure 9I:
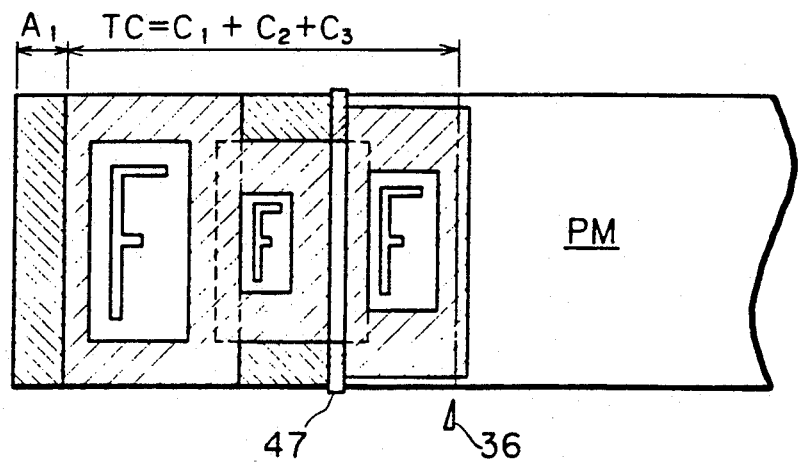
Figure 9J:
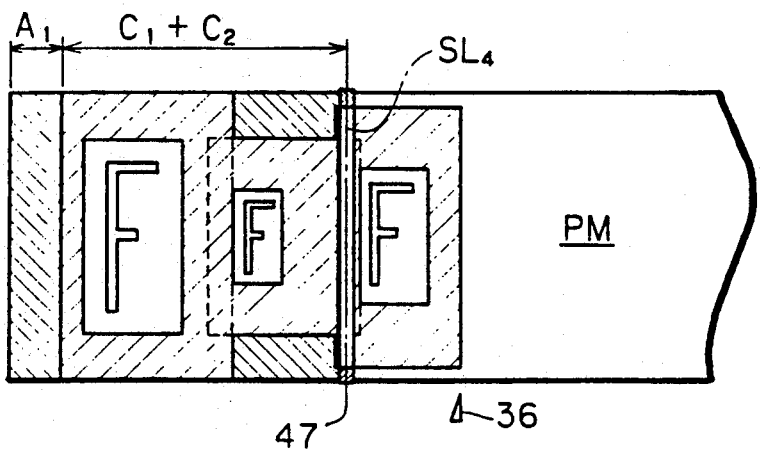

When the reproduction of all of the images $I_1$ to $I_3$ has finished see FIG. 9I), the sequence will jump from Step S13 to Step S16.

Jumping Step S16, the rollers keep further feeding the photosensitive material PM until the length being fed from Step S4 coincides with the feeding length L which is entered beforehand in Step S1. A fourth supplementary exposure line $SL_4$ reaches the supplementary exposure position in the midst of the feed (FIG. 9J), and Steps S31 to S35 will be carried out.

Figure 9K:
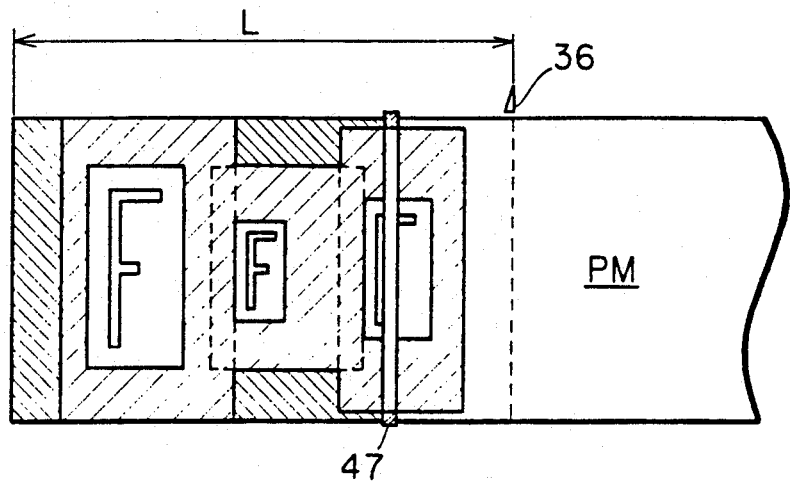
Figure 9L:
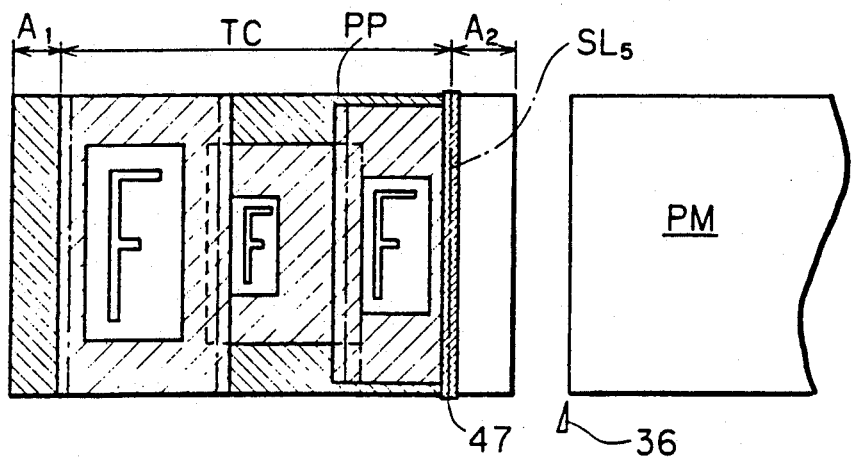

Then, the distance which the photosensitive material PM has advanced coincides with the feeding length L. Responding to this, the rollers stop feeding the photosensitive material PM and the supplementary light source 47 is turned off (Step S17). Thereafter, the cutter unit 36 cuts off the photosensitive material PM (Step 18; FIG. 9K), whereby a photosensitive material sheet PP is provided.

In Step 19, the roller set 35 starts feeding the photosensitive material sheet PP. Required LEDs are turned on from the both ends of the supplementary light source 47 in this stage.

Then, a fifth supplementary exposure line $SL_5$ reaches the supplementary exposure position (FIG. 9L), and Steps S31 to S35 will carried out so that all of the LEDs are turned on. Thus, the supplementary light source 47 starts exposing the non-scanning region in the edge portion, the width of which is the distance $A_2$.

The rear edge of the photosensitive material sheet PP reaches the position of the roller set 35 (Step S20), and the roller set 35 stops rotating (Step S21). In Step S21, the supplementary light source 47 is turned off. Since the processor roller set 55 maintains its rotation even after the roller set 35 stops rotating, the photosensitive material sheet PP gradually loses its loosening between the roller sets 35 and 55 (see FIG. 2).

Then complete elimination of the loosening is detected (Step S22), so that the supplementary light source 47 is turned on again (Step S23). The equation (6) below yields a time period $t_l$ since the roller set 35 stops rotating in Step S21 until the photosensitive material loses its loosening in Step S22.

$$t_l = (v_{35}t_{35} - v_{55}t_{55})/v_{55} + w_3/v_{35} - w_3/v_{55} \qquad (6)$$

where symbols $v_{35}$ and $t_{55}$ represent feeding speeds of the roller sets 35 and 55, respectively, symbols $t_{35}$ and $t_{55}$ represent accumulated operation periods of the roller sets 35 and 55 (the rollers 55 is in operation), respectively, and symbol $w_3$ represents a distance between the roller set 35 and the roller set 55. A value of the time period $t_l$ is calculated in the scan control part 73d.

The processor roller set 55 rotates for the period $t_l$ after the roller set 35 has stopped rotating. As the photosensitive material sheet PP gradually loses its loosening, the rear edge thereof moves toward the processor rollers 55 from the position of the rollers 35. The supplementary light source 47 thus exposes the area remaining unexposed in the edge portion of the non-scanning region, i.e., the area whose length is $A_2$ (Step S23). Then, the rear edge of the photosensitive material sheet PP passes the supplementary exposure position (Step S24), whereafter the supplementary light source 47 is turned off (Step S25). Thus, exposure is completed. The exposed photosensitive material sheet pp will receive treatment in the development unit 5, whereby it will be finished as the printing plate PP of FIG. 5.

According to the first embodiment, it is easy to reproduce images $I_1$ to $I_3$ on a single printing plate through multi-placing. Additionally, the first embodiment offers an advantage that the images $I_1$ to $I_3$ can be reproduced at any desired reproduction magnifications $M_1$ to $M_3$, respectively. A still further advantage according to the first embodiment lies in easy exposure of non-scanning regions as heretofore described; that is, it is easy to expose the non-scanning regions RN, since only required LEDs are turned on according to calculation which determines the number of the LEDs to be turned on based on the magnifications $M_1$ to $M_3$.

In addition, according to the first embodiment, the original OR is illuminated only during reproduction of the scanning regions which include the respective images $I_1$ to $I_3$. Therefore, the original OR need not be illuminated during exposure of the non-scanning regions RN. This prevents the surface of the original from being excessively heated, thus promising still another merit.

In the first embodiment, a plurality of images, namely, the images $I_1$, $I_2$ and $I_3$, are automatically reproduced on the same printing plate from a single original OR. However, this is not limiting; images $I_1$ to $I_3$ may be reproduced from different originals. In that case, the operator changes an original which is being mounted to the original holder 2 for other original in Step S15. Efficient replacement can be easily attained if the data display part 71b displays an original setting position D1 for each of the images in such a case. An original setting position D1 is obtained from equation (1) by substituting each reproduction magnification $M_1$, $M_2$ or $M_3$ of the images $I_1$, $I_2$ and $I_3$ for the value $M_{max}$, which is the maximum of the magnifications $M_1$, $M_2$ and $M_3$.

This allows the images $I_1$ to $I_3$ to be arranged differently from the arrangement of FIG. 5, with the top edges thereof equidistant from the top edge of the photosensitive material PM by a distance B, i.e., the value of the holding width. In such reproduction from different originals, the operator specifies in advance in Step S1 whether the reproduction requires originals to be changed by the operator's manual work or the reproduction involves only one original.

Improvement of Photosensitive Material Feed Unit

In the first embodiment of FIG. I, a printing plate PP can be produced not only from a photosensitive material out of a roll 31 but also out of a roll 32. Replacing the photosensitive material from the roll 31 with the photosensitive material from the roll 32, the photosensitive material must be rewound with the roll 31. Here a problem arises in that it is difficult to rewind the photosensitive material since a photosensitive material feed unit includes an one-way clutch mounted to a rotation shaft of a feed roller. For example, the one-way clutch skids when a drive motor reversely rotates, consequently failing to feed the photosensitive material. In addition, if the other feed roller is reversely rotated in an attempt to rewind the photosensitive material, the one-way clutch becomes locked and intercepts reverse feed of the photosensitive material.

In order to cope with this problem, the present invention introduces improvements in a photosensitive material feed unit. Interception of a photosensitive material caused by a one-way clutch is successfully prevented in an improved photosensitive material feed unit.

Figure 10:
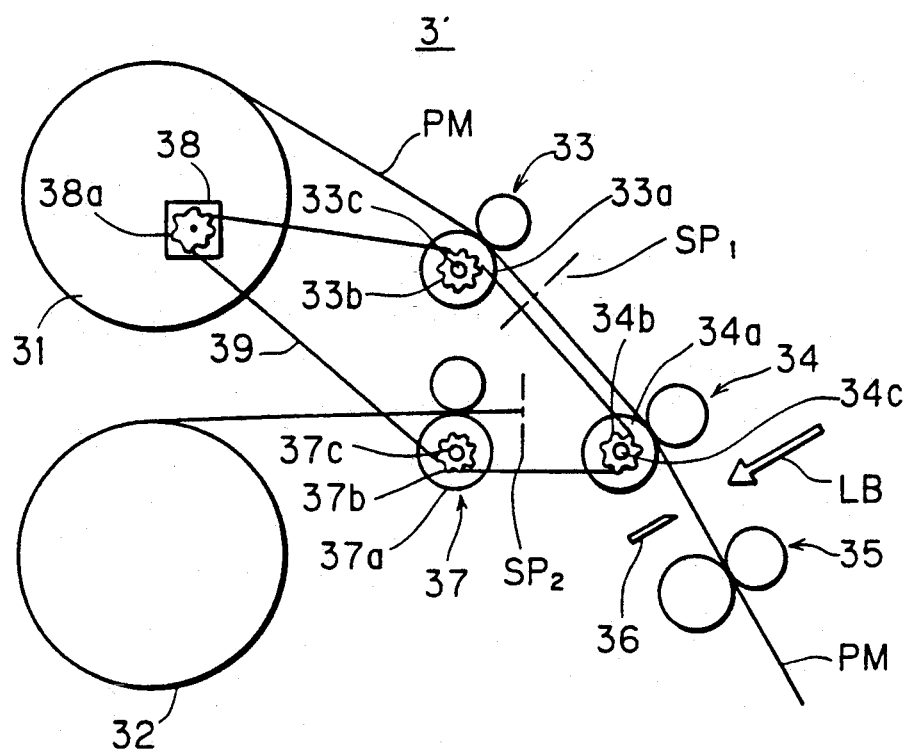
FIG. 10 is an enlarged side view of the photosensitive mateiral feed unit of FIG. 2.
Figure 11:
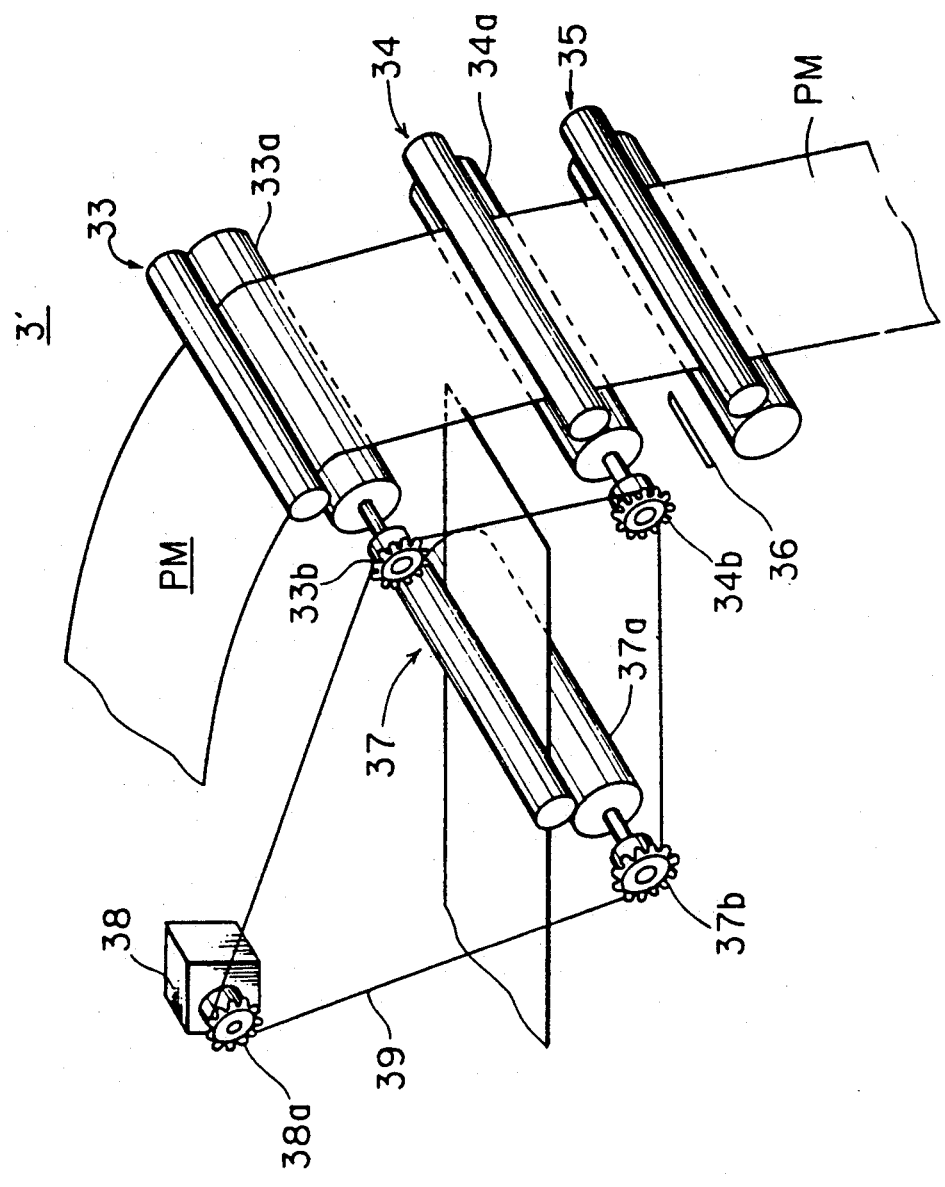
FIG. 11 is an essential perspective of FIG. 10.

FIG. 10 is a schematic side view of the improved photosensitive material feed unit 3' according to the present invention. FIG. 11 is an essentially schematic perspective of the photosensitive material feed unit 3'. The figures illustrate the feed unit from a side opposite to FIG. 1.

Sprockets 33b, 34b and 37b are mounted to drive rollers 33a, 34a and 37a of roller sets 33, 34 and 37, respectively. A sprocket 38a is axially mounted to a motor 38, the motor 38 being rotatable in two opposite directions. The four sprockets 33b, 34b, 37b and 38b are linked through a chain 39. As will be described in detail, the feeding speed of the roller set 34 is greater than that of both the roller sets 33 and 37.

Figure 12:
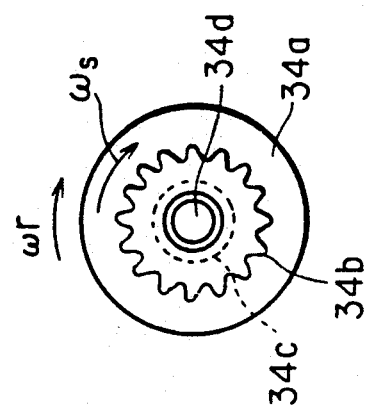
FIG. 12 is a plan view of a roller set to which one-way clutch is connected.

FIG. 12 is a plan view of the drive roller 34a and the sprocket 34b. A one-way clutch 34c is movably mounted in the sprocket 34b; more precisely, the outer circumference of the one-way clutch 34c is fixed to the sprocket 34b whereas the inner circumference thereof is fixed to a shaft 34d of the drive roller 34a. Thus, the sprocket 34b engages with the drive roller 34a when clockwisely driven, allowing the one-way clutch 34c to feed the photosensitive material PM in a lower right direction in FIG. 11. On the other hand, when the drive roller 34a is driven clockwise relatively to the sprocket 34b, i.e. is, a clockwise angular velocity $\omega_r$ of the drive roller 34a exceeds a clockwise angular velocity $\omega_s$ of the sprocket 34b, the one-way clutch 34c skids.

The other two sprockets 33b and 37b are axially mounted to the drive rollers 33a and 37a through electromagnetic clutches 33c and 37c, respectively (FIG. 10).

Operations for feeding photosensitive material PM in the photosensitive material feeding direction will now be described. First, the leading edge of photosensitive material PM from the first roll 31 and the leading edge of photosensitive material PM from the second roll 32 are in their waiting positions $SP_1$ and $SP_2$. If the first roll 31 is the one to provide a photosensitive material for a printing plate, a corresponding photosensitive material PM is nipped between the roller set 33. Then, the motor 38 is clockwisely rotated clockwise to allow run of the chain 39. During this, the electro-magnetic clutch 33c of the roller set 33 is turning on (i.e., engaging) whereas the electromagnetic clutch 37c of the roller set 37 is not (i.e., skidding). Clutch control means for turning the electromagnetic clutches on-off is not drawn here because it is rather simple. A leading edge portion of the photosensitive material PM being fed by the roller set 33 then reaches the next roller set 34. Then, the photosensitive material PM is further fed toward the roller set 35 whose feeding speed is greater than that of the roller set 34. When the leading edge of the photosensitive material PM reaches the exposure position upon which the projection light beam LB impinges, a sensor (not shown) detects the same, and concurrently the electro magnetic clutch 33c of the roller 33a is turned off and starts skidding. This allows the roller set 34 to feed the photosensitive material PM as a result. The next roller set 35, which owes its rotation to a motor (not shown) other than the motor 38, feeds the photosensitive material at a feeding speed greater than that of the roller set 34. The one-way clutch 34c starts skidding once the roller set 35 starts feeding the photosensitive material PM, thereafter permitting the photosensitive material PM to be fed at the feeding speed of the roller set 35. The roller set 34 retains its nipping power (holding power) even when the one-way clutch 34c is skidding. This allows the rollers to feed the photosensitive material PM while applying tension to the photosensitive material PM. Thus, the photosensitive material PM, prohibited from being loosened by the tension, remains tensed between the two roller sets 34 and 35. The projection light beam LB impinges upon thus tensed photosensitive material PM.

Next, operations for rewinding the photosensitive material PM into the first roll 31 will now be explained. The photosensitive material PM is rewound after cut off by the cutting unit 36 in normal operation. Hence, the leading edge of the photosensitive material PM coincides with a cut off position at first. Rewind of the photosensitive material PM is attained by anti-clockwise run of the chain 39 caused by reverse rotation of the motor 38. At the same time, the electro-magnetic clutch 33c of the roller set 33 is turning on (i.e., engaging) whereas the electro-magnetic clutch 37c of the roller set 37 is not (i.e., skidding), similarly to the feed in the photosensitive material feeding direction. This causes the drive roller 33a to rotate in the anti-clockwise direction. On the other hand, anti-clockwise rotation of the sprocket 34b causes the one-way clutch 34c not to engage with the drive roller 34a, so that the drive roller 34a freely rotates. Thus, the roller set 33 rewinds the photosensitive material PM into the roll 31.

Figure 13:
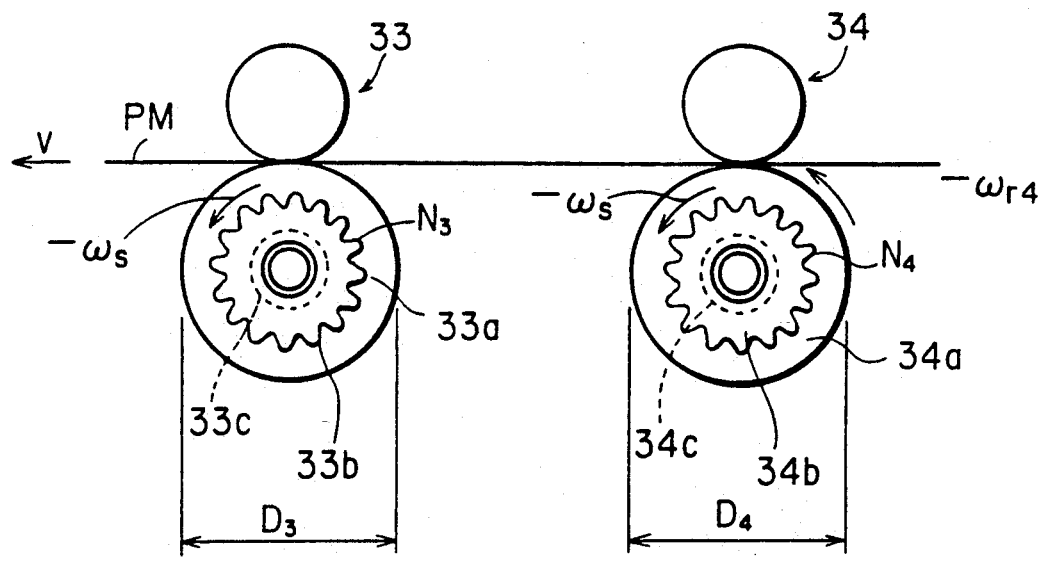
FIG. 13 is an explanatory diagram showing operations of roller sets.

FIG. 13 illustrates the relationship between the two roller sets 33 and 34. In this embodiment, the number $N_3$ of the teeth of the sprocket 33b coincides with that $N_4$ of the sprocket 34b. This allows the sprockets 33b and 34b to rotate at the same angular velocity $\omega_s$ (rad/sec) in the anti-clockwise direction. Positive values for angular velocities are measured in the clockwise, negative values in the anti-clockwise. Since the electro-magnetic clutch 33c is in engagement with the drive roller 33a, the drive roller 33a rotates anti-clockwisely at the angular velocity of $\omega_s$ similarly to the sprocket 33b. Defining the outer diameter of the drive roller 33a as $D_3$ (m), the velocity of the outer circumference of the drive roller 33a, namely, the feeding speed v (m/sec) of the photosensitive material PM is:

$$v = \omega_s D_3/2 \qquad (7)$$

The photosensitive material PM fed by the roller set 33 is pulling the outer circumferential surface of the drive roller 34a of the roller set 34 to the left side of FIG. 13 at the velocity of v. Defining the outer diameter of the drive roller 34a as $D_4$ (m), its angular velocity $\omega_{r4}$ in the anti-clockwise direction is:

$$\omega_{r4} = 2v/D_4 \qquad (8)$$

and thus $$\omega_{r4} = \omega_s D_3/D_4 \qquad (9)$$

As mentioned earlier, the roller set 33 must feed the photosensitive material PM faster than the roller set 34 when operating in the feed direction. For this purpose, the outer diameter $D_3$ of the drive roller 33a is smaller than the outer diameter $D_4$ of the drive roller 34a. Accordingly, the value of $D_3/D_4$ of the equation (9) becomes smaller than 1, and therefore, the angular velocities $\omega_{r4}$ and $\omega_s$ have the following relation:

$$\omega_{r4} < \omega_s \qquad (10)$$

Thus, as shown in the inequality (10), the anti-clockwise angular velocity $\omega_{r4}$ of the drive roller 34a is smaller than the anti-clockwise angular velocity $\omega_s$ of the sprocket 34b during the rewind of the photosensitive material PM; in other words, the drive roller 34a is clockwisely rotating relative to the sprocket 34b. This relative movement causes the one-way clutch 34c to skid, so that the photosensitive material PM is rewound at the velocity of v without being intercepted by the roller set 34.

According to the improvement, the angular velocity $\omega_{r4}$ of the drive roller 34a is smaller than the angular velocity $\omega_s$ of the sprocket 34b when the drive roller 34a of the roller set 34 rotates in the anti-clockwise direction, whereby the one-way clutch 34c is prevented from being locked. Consequently, the photosensitive material PM can be smoothly rewound.

The two sprockets 33b and 34b may each have a different number of teeth, contrary to the above improvement where the values $N_3$ and $N_4$ which express the number of the teeth of the sprockets 33b and 34b are coincident. Being inversely proportional to the values $N_3$ and $N_4$, the angular velocities $\omega_{s3}$ and $\omega_{s4}$ of the sprockets 33b and 34b are:

$$\omega_{s3} = k/N_3 \qquad (11)$$

$$\omega_{s4} = k/N_4 \qquad (12)$$

where k is a constant.

Since the angular velocity of the drive roller 33a is equal to the angular velocity $\omega_{s4}$ of the sprocket 33b, the circumferential velocity $v_3$ of the drive roller 33a is:

$$\begin{aligned} v_3 &= \omega_{s3} D_3/2 \\ &= k D_3/2 \end{aligned} \qquad (13)$$

Thus obtained velocity $v_3$ is the velocity at which the photosensitive material PM is rewound. The photosensitive material PM advancing backward serves to rotate the drive roller 34a in the anti-clockwise direction. The angular velocity $\omega_{r4}$ of the drive roller 34a in the anti-clockwise rotation is obtained by the following equation (14) which is similar to the equation (9):

$$\begin{aligned} \omega_{r4} &= 2 v_3/D_4 \\ &= k D_3/(D_4 N_3) \end{aligned} \qquad (14)$$

Rewind of the photosensitive material PM without locking of the one-way clutch 34c can be attained by setting the angular velocity $\omega_{r4}$ of the drive roller 34a smaller than the angular velocity $\omega_{s4}$ of the sprocket 34b. That is:

$$\omega_{r4} < \omega_{s4} \quad (15)$$

Substitution of the equations (12) and (14) into the inequality (15) gives:

$$D_3/N_3 < D_4/N_4 \quad (16)$$

As shown in the inequality (16), rewind of the photosensitive material PM can be attained if the ratio of the outer diameter $D_3$ of the drive roller 33a to the number of the teeth $N_3$ of the sprocket 33b is greater than the ratio of the outer diameter $D_4$ of the drive roller 34a to the number of the teeth $N_4$ of the sprocket 34b.

The chain 39 and the sprockets 33a and 33b cooperatively drive the roller sets 33 and 34 in the above improvement. However, other power transmit units can be employed instead; for example, two pulleys and a belt. If two pulleys and a belt are employed, diameters of the pulleys are substituted for the symbols $N_3$ and $N_4$, each expressing the number of the teeth of the sprockets, in the inequality (16).

If the numbers of the teeth $N_3$ and $N_4$ and the outer diameters $D_3$ and $D_4$ are set to conform with the inequality (16), the feeding speed of the roller set 34 becomes greater than that of the roller set 33 in normal feed of the photosensitive material PM in the photosensitive material feeding direction. If the two roller sets 33 and 34 possess large nipping stress (i.e., holding power), the two roller sets are likely to stretch the photosensitive material PM. In order to prevent this, the nipping power of the roller set 33 is set relatively small. When the roller set 33 possesses small nipping power, the photosensitive material PM advances at the feeding speed of the roller set 34 while sliding between the nip area of the roller set 33, thus successfully preventing stretch from occuring.

Feed and rewind of photosensitive material of the second roll 32 are identical to those of the first roll 31. The roller set 37 for the second roll 32 is equivalent in structure to the roller set 33 for the first roll 31. More particularly, the two roller sets 33 and 37 are the same with respect to the ratio of the outer diameter of the drive roller to the number of the teeth of the sprocket. This enables rewind the photosensitive material into the second roll 32 in a similar manner to the rewind of the first roll 31.

The scan-exposure camera of FIG. 1 contains the two rolls 31 and 32 in the first embodiment; still, the number of rolls may be any number only if larger than one. If the scan-exposure camera contains only one roll, the roller set 37 is eliminated accordingly. However, it is advantageous to employ two rolls as in the first embodiment, or more rolls for the sake of efficiency, since such enables image reproduction onto two different kinds of photosensitive material by changing the rolls within the reproduction camera.

B. Second Embodiment

As mentioned earlier, changes in a mounting method and a reproduction magnification exert considerable affect on an optimum setting position of an original to be mounted to an original holder, requiring the original to move in a pursuit of the optimum position at every replacement of originals. The present invention also resolves this problem. In the second embodiment, procedures of producing a printing plate are explained in light of this problem.

Production of Side-Mounted Type Printing Plate

Figure 14A:
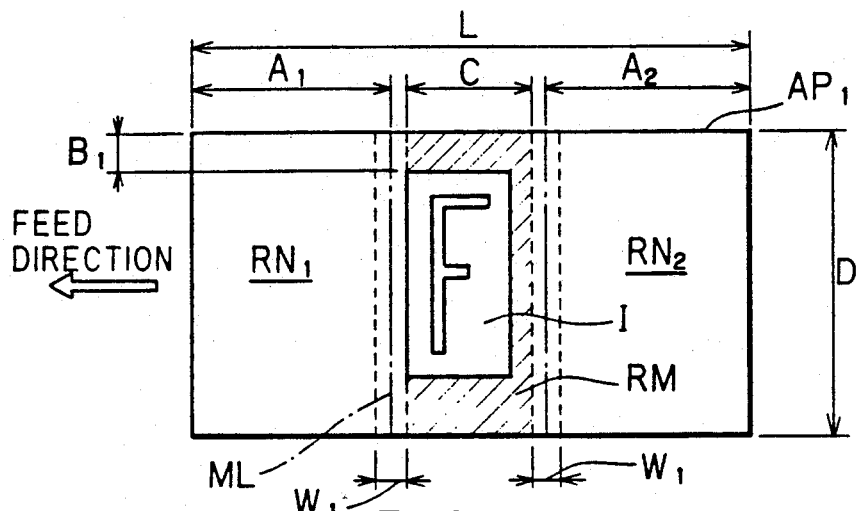
FIGS. 14A to 14C are plan views of a side-mounted type printing plate.

FIG. 14A is a plan view of a side-mounted type printing plate $AP_1$, which is produced by the scan-exposure camera of FIG. 1. The printing plate $AP_1$ is D in width and L in length. The printing plate $AP_1$ has a scanning region RM including an image I. Generated on the both sides of the scanning region RM are a non-scanning region in leading edge portion $RN_1$ and a non-scanning region in tail edge portion $RN_2$. As shown in FIG. 14A, a feeding direction of the photosensitive material for the printing plate $AP_1$ is along the arrow expressing the length L. The scanning region RM measures C along the photosensitive material feeding direction, and the term "scanning length" refers to the length of the same. The non-scanning regions $RN_1$ and $RN_2$ have lengths of $A_1$ and $A_2$, respectively.

The scanning region RM is placed in the center of the printing plate $AP_1$ with respect to the length L as is common with a side-mounted type printing plate. Hence, the lengths $A_1$ and $A_2$ must take the same value. The printing plate $AP_1$ also has a holding space with width of $B_1$ on the top or the bottom portion thereof (on the top portion in this embodiment of FIG. 14A). The object of providing the holding space is to prevent a clip unit from holding the printing plate on the area of the image I. the clip unit fixing the printing plate on a printing machine.

In producing the printing plate $AP_1$ of FIG. 14A, the operator initially provides a data input part 71a with the following values:

a) reproduction magnification M for image I
b) width D of photosensitive material
c) photosensitive material feeding length L
d) scanning length C of scanning region RM
e) total scanning length TC=C The operator also specifies a type of a printing plate, that is, a side-mounted type in this embodiment.

A computation part 73a of a CPU 73 calculates original setting position data D1 based on the magnification M, the width D and the holding space width B. The original setting position data D1 gives an original setting position on a platen 21.

Figure 15:
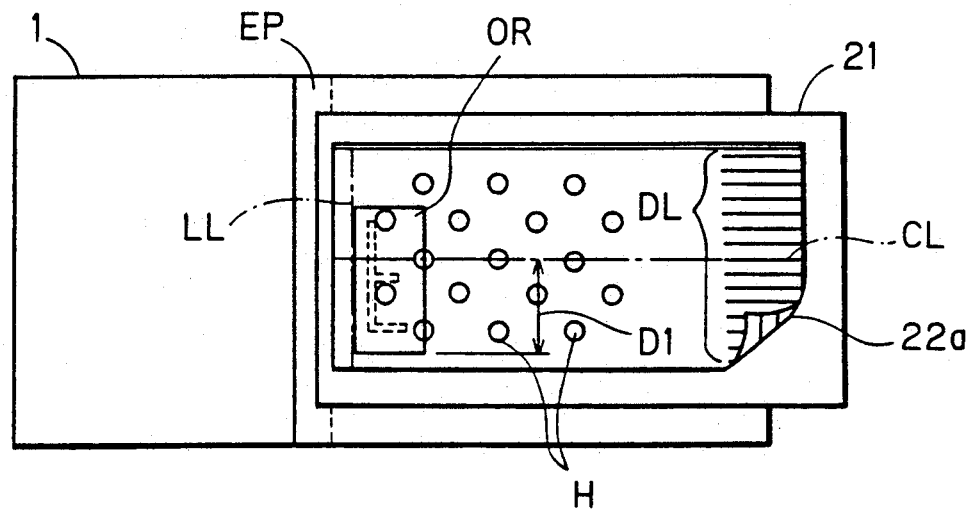
FIGS. 15 and 18 are plan views showing an original being set on a platen.

FIG. 15 is a plane view of a setting position of an original OR on the platen. The original OR is set with its surface-to-be-scanned down on the platen 21 which is made of a transparent glass plate. One edge of a positioning sheet 22a is fixed to the platen 21, the positioning sheet 22a being semi-transparent (or transparent). The operator covers the original OR with this positioning sheet 22a. The positioning sheet 22a has a center line CL, a left reference line LL, and distance lines DL which indicate the distance from the center line CL toward the top or the bottom edge. In FIG. 15, the positioning sheet 22a is only partly lined with the distance lines DL. However, this is merely for illustration convenience; the positioning sheet 22a has the distance lines DL drawn on its entire surface. There are holes H here and there on the positioning sheet 22a. The operator pokes his or her finger into the holes H and moves the original OR behind the positioning sheet 22a, whereby the position of the original OR is adjusted. FIG. 15 illustrates the scan-exposure camera as it is prior to image reproduction. In this stage, the left reference line LL is in the right side to an exposure part EP of the box 1. The exposure part EP is illuminated by the main light source 41. In reproducing an image, exposure is synchronized with slide movement of the platen 21 to the left side.

The original setting position data D1, which indicates the distance between the center line CL and the bottom edge of the original OR, is obtained by:

$$D1 = (D/2 - B_1)/M \qquad (17)$$

Thus obtained value of the original setting position data D1 is then given from the computation part 73a through a scan control part 73d and an input/output interface 72 to a data display part 71b. Thus, the value of the positioning data D1 is displayed. Then, The operator aligns the left edge of the original OR and the left reference line LL in accordance with the displayed data D1, whereby the original OR is mounted to the platen 21.

A lighting width computation part 73b determines the lighting width of a supplementary light source 47 based on the magnification M and the lighting data which is given thereto from a LED lighting data memory 73e. The supplementary light source 47 is comprised of numerous LEDs arranged in a straight line along the direction perpendicular to the feed direction. The computation part 73b determines the number of the LEDs required to be turned on. The LEDs, according to the number, are turned on from the both ends of the line of the LEDs, to thereby expose the non-scanning regions RN.

A photosensitive material feed computation part 73c calculates a length of the photosensitive material PM is to be fed by roller sets 34 and 35 based on the magnification M, the holding space width $B_1$, the feeding length L, the scanning length C and the total scanning length TC. In the example of FIG. 14A, the computation part 73c calculates the length $A_1$ of the non-scanning region in the leading edge portion and the length $A_2$ of the non-scanning region in the tail edge portion. The length $A_1$ is the length by which only the photosensitive material PM must be fed prior to the feed of an original holder 2. After the photosensitive material PM is fed by the length $A_1$, reproducing an image of the original OR thereon is carried out; that is, the original holder 2 is synchronously fed while the photosensitive material PM is fed. Consequently, the image I is reproduced in the position of FIG. 14A. As mentioned earlier, the length $A_1$ is the same as the length $A_2$. The value of the lengths is obtained as:

$$A_1 = A_2 = (L - C - W_1)/2 \qquad (18)$$

The photosensitive material feed computation part 73c calculates a value of the lengths $A_1$ and $A_2$ and gives the same, together with the value of the scanning length C, to the scan control part 73d.

The scan control part 73d receives a scan start signal $S_e$ from the data input part 71a in addition to such values as the number of the LEDs to be turned on (hereinafter referred to as a "lighting number") and the lengths $A_1$ and $A_2$. The scan control part 73d also receives an initial position signal $S_O$ from an original initial position sensor 25 installed below the original holder 2 and a photosensitive material feed pulse signal $S_p$ from an encoder (not shown) of a motor 35m for driving the roller set 35. The scan control part 73d gives instructions according to these signals and values to an optical system control part 74a, a supplementary light source control part 74b and to a motor control part 74c, all of which are installed in a power control unit 74, so as to control scan.

The optical system control part 74a not only turns the main light source 41 on-off through the input/output inter face 72 but adjusts a magnification power of a projection optical system 4. The supplementary light source control part 74b, on the other hand, turns the supplementary light source 47 according to a lighting number N through the input/output interface 72. The motor control part 74c controls operations of drive motors; that is, control over the motor 23 for driving the original holder 2, a motor 34m for the roller set 34, the motor 35m for the roller set 35, a motor 55 for roller set 55, and a motor 36m for a cutting unit 36.

Figure 16:
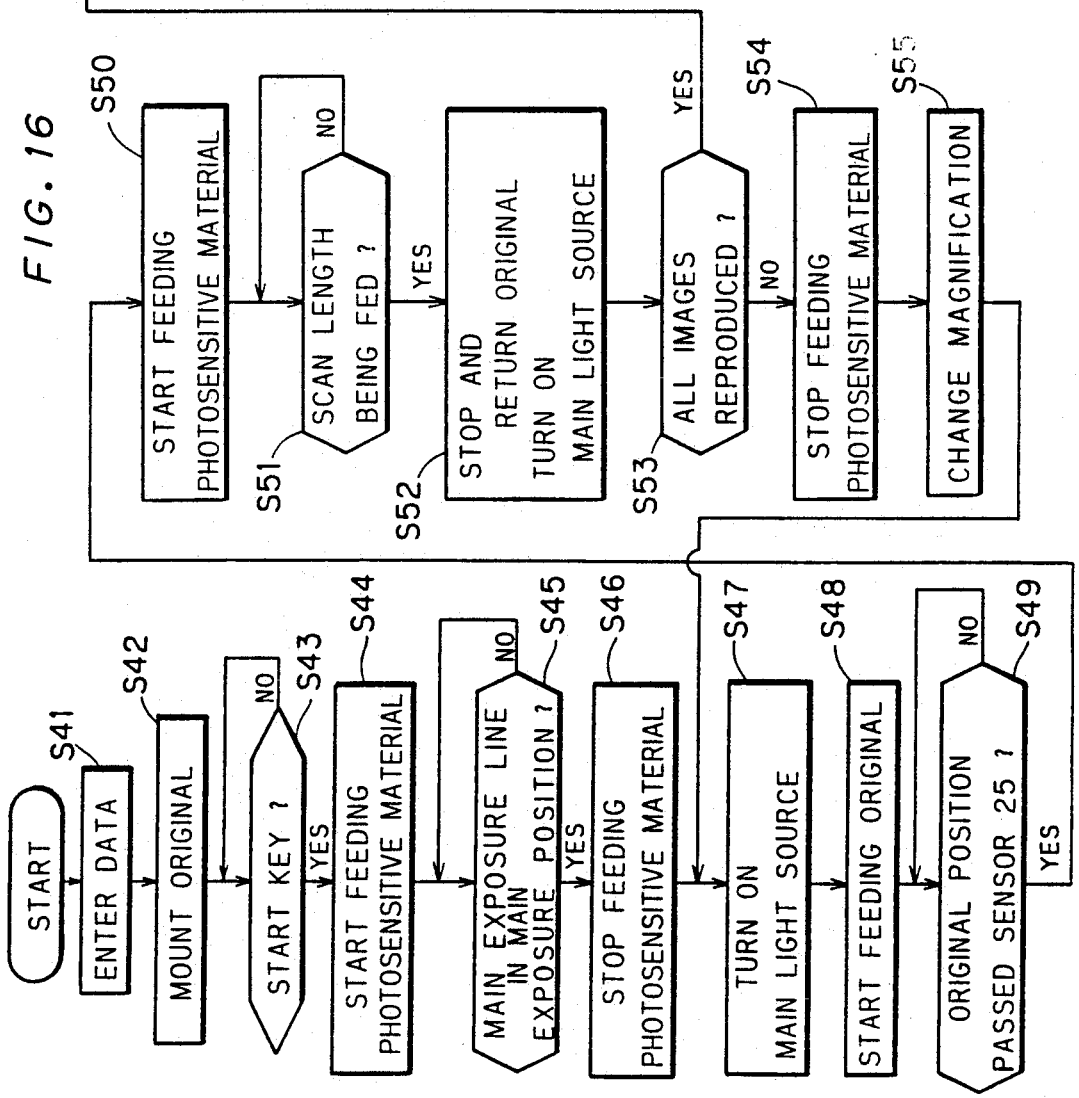
FIG. 16 is a flowchart showing the procedures of reproduction according to a second embodiment.

FIG. 16 is a flowchart showing the procedures of producing the printing plate $AP_1$.

First, in Step S41, the operator enters the required data in the data input part 71a, the required data being of the reproduction magnification M, the photosensitive material width D, the holding length B, the photosensitive material feeding length L, the scanning length C and the total scanning length TC. The operator also specifies a mode expressing a type of a printing plate, i.e., whether a demanded printing plate is the top-or-bottom-mounted type or the side-mounted type. The leading edge of a photosensitive material PM is in the cut off position where the cutting unit 36 cuts off the photosensitive material PM. The cut off position coincides with the center of the projection area of a projection light beam LB in this embodiment. The term "main exposure position" refers to this position. Further, the term "supplementary exposure position" refers to the position where the supplementary light source 47 exposes the photosensitive material PM.

In manufacturing this side-mounted type printing plate, the original setting position data D1 is calculated from the equation (17), to be displayed in the data display part 71b. The operator reads the data D1 and places the original OR based on the same in the position of FIG. 15 (Step S42).

The operator taps a start key of the data input part 71a (Step S43), and the scan-exposure camera will execute the remaining steps.

In Step S44, the lengths $A_1$ and $A_2$, which are coincident with each other, are calculated from the equation (18). Then, the photosensitive material PM is fed according to the obtained value.

Whether a main exposure line has reached the main exposure position or not is then detected (Step S45). The term "scan boundary line" ML refers to a line which keeps half of the distance $W_1$ away from the left edge of the scanning region RM of FIG. 14A; that is, it is the left one of the two dashed-and-dotted lines.

The roller set 35 feeds the photosensitive material PM by the length $A_1$, and the scan boundary line ML will arrive at the main exposure position. The arrival of a main exposure line ML causes the roller set 35 to stop, which in turn stops the feed of the photosensitive material PM (Step S46). The main light source 41 is turned on in response to this (Step S47), projecting the projection light beam LB in the form of a slit with a width of $W_1$ onto the photosensitive material PM in the region around the scan boundary line ML. Thus, the projection light beam LB exposes the region in width of $W_1/2$ between the scanning region RM and the non-scanning region $RN_1$ (FIG. 14A).

In the stage above, the photosensitive material PM is fed based on a feeding length calculated in the scan control part 73d. The scan control part 73d calculates the feeding length based on a pulse signal $S_p$ derived from an encoder (not shown) installed in the motor 35m (FIG. 3) for the roller set 35. In each Steps S51 and S56 described below, the length of the photosensitive material PM fed by the roller set 35 is obtained similarly to the above, and thereafter the prescribed judgement is carried out.

Next, the original holder 2 starts to be moved to the left side from its waiting position of FIG. 4 (Step S48). When the original initial position sensor 25 detects that a predetermined original initial position of the original holder 2 has passed the same (Step 49), the photosensitive material is restarted to be fed (Step 50). The projection light beam LB, reflected from the original OR just below the left reference line LL (FIG. 15), is impinging on the photosensitive material PM in the main exposure position at the beginning of the feed of the photosensitive material PM. Further, the photosensitive material PM and the original OR are fed in a synchronous manner. Consequently, the image I is reproduced on the photosensitive material PM.

When the feeding length of the photosensitive material PM from Step S44 coincides with the scanning length C (Step S51), the original holder 2 is stopped and returned to its waiting position (Step S52).

Where a plurality of images are demanded on a single printing plate, the scan-exposure camera will proceed to Step S54 in which the photosensitive material PM is stopped. Following this, the projection optical system 4 is adjusted in order to change a value of the reproduction magnification M (Step S55). Thereafter the procedures after Step S46 will be repeated so that the subsequent image will be reproduced at a corresponding magnification. However, the printing plate $AP_1$ of FIG. 14A requires only one image I, and Step S56 is carried out in turn.

The rollers keep feeding the photosensitive material PM until a feeding length from the beginning of Step S44 coincides with the feeding length L which has been initially entered in Step S41 (Step S56).

When the photosensitive material PM has been fed by the feeding length L, the feed of the photosensitive material PM is stopped (Step S57). Then, the photosensitive material PM is cut off by the cutting unit 36 (Step S58). The photosensitive material PM thus cut off is then conveyed to a development unit 5 where it will be treated, whereby the production of the printing plate $AP_1$ of FIG. 14A is completed.

The description of the above sequence has not referred to operation of the supplementary light source 47. Briefly describing this, the supplementary light source 47, under control of the scan Control part 73d, exposes the non-scanning regions $RN_1$ and $RN_2$ in the leading and the tail edge portion by turning on all the LEDs thereof. As has been described in the first embodiment, a negative type photosensitive material is commonly used in an scan-exposure camera for use in direct production from an original. Therefore, this exposure of the non-scanning regions $RN_1$ and $RN_2$ cannot be omitted in order to strictly avoid inking thereto. Procedures of the exposure by the supplementary light source 47 are identical to those described in the first embodiment and therefore are not reiterated here.

Figure 14B:
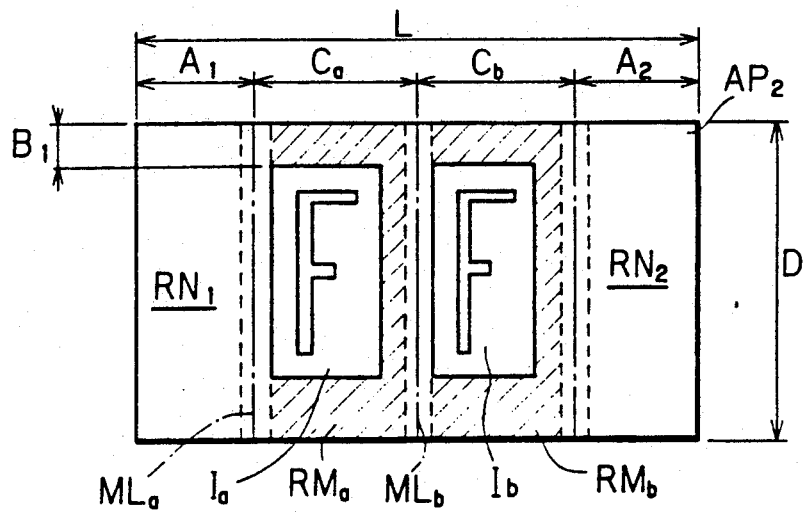

FIG. 14B is a plan view of a side-mounted type printing plate $AP_2$. Two scanning regions $RM_a$ and $RM_b$ on the printing plate $AP_2$ include images $I_a$ and $I_b$, respectively. In producing the printing plate $AP_2$, data to be entered in the data input part 71a are: a feeding length L and a width D of a photosensitive material; a holding length $B_1$; scan lengths $C_a$ and $C_b$ of the two scanning regions $RE_a$ and $RE_b$; a total scanning length $TC = C_a + C_b$; and reproduction magnifications $M_a$ and $M_b$ of the images $I_a$ and $I_b$. As in FIG. 14B, scanning lengths $C_a$ band $C_b$ are defined as the accumulation of half the width $W_1$ and the lengths of the scanning regions $RM_a$ and $RM_b$ taken along the feed direction, respectively. In reverse thinking, the areas corresponding to the scanning lengths $C_a$ and $C_b$ can be defined as scanning regions $RM_a$ and $RM_b$. According to the latter definition, not the equation (18) but the following equation (19) yields the lengths $A_1$ and $A_2$ of the non-scanning regions.

$$A_1 = A_2 = (L - TC)/2 \tag{19}$$

A scanning length (or a scanning region) of the earlier example of FIG. 14A may of course be defined in a similar manner to the above.

The procedures of producing the printing plate $AP_2$ of FIG. 14B are substantially the same as those shown in the flowchart of FIG. 16. It must be noted that, in the case that images $I_a$ and $I_b$ are reproduced from the same single original at the same magnification, the original OR is not required to be moved within the original holder 2 during reproduction of the second image $I_b$. This enables, once the original is mounted to the original holder 2, automatic and continuous reproduction of the two images $I_a$ and $I_b$ onto a photosensitive material. In such reproduction in which a plurality of images are automatically reproduced from a single original onto a photosensitive material (automatic reproduction mode), the operator chooses a mode indicative thereof and enters it in the data input part 71a so that the demanded reproduction will be carried out.

Figure 14C:
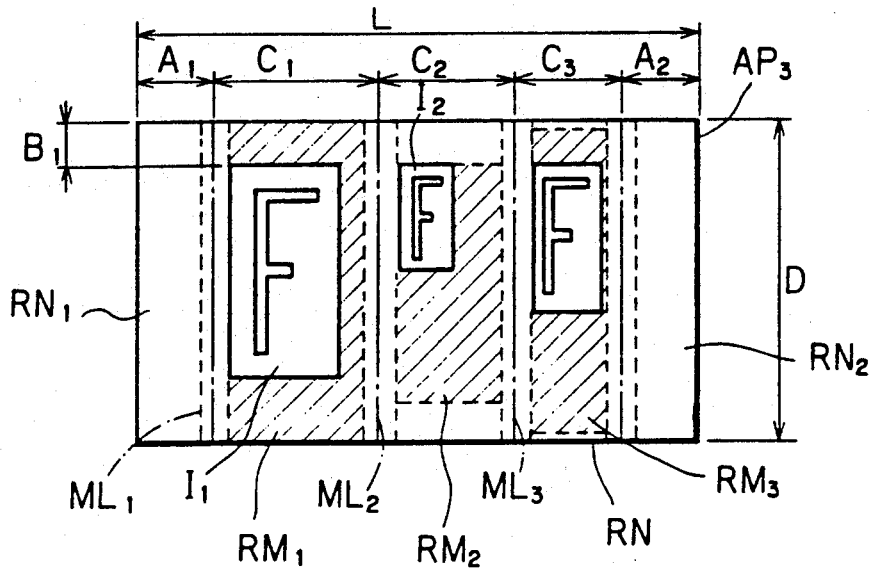

FIG. 14C is a plan view of a side-mounted type printing plate $AP_3$. Three scanning regions $RM_1$, $RM_2$ and $RM_3$ on the printing plate $AP_3$ include images $I_1$ to $I_3$, respectively. In producing the printing plate $AP_3$, data required to be entered in the data input part 71a are: a feeding length L and a width D of a photosensitive material; a holding length $B_1$; scanning lengths $C_1$, $C_2$ and $C_3$ of the three scanning regions $RE_1$, $RE_2$ and $RE_3$; total scanning length $TC = C_1 + C_2 + C_3$; and reproduction magnifications $M_1$, $M_2$ and $M_3$ of the images $I_1$, $I_2$ and $I_3$.

The reproduction magnifications $M_1$, $M_2$ and $M_3$ of the images $I_1$, $I_2$ and $I_3$ of FIG. 14C are different from each other. The images $I_1$ to $I_3$ are placed so that their top edge border on the holding space. In order to place the images in such a manner, the operator adjusts the position of the original OR within the original holder 2 according to the equation (17) prior to each scan of the second and third scanning region $RM_2$ and $RM_3$ (that is, during each jump from Step S54 to Step S47).

Non-scanning regions RN are provided on both end portions with respect to the direction of the width of the scanning regions $RM_2$ and $RM_3$ of FIG. 14C (the upper-and-lower direction on the drawing sheet). The non-scanning regions RN cannot be exposed with the projection light beam LB reflected from original OR and the platen 21, but can be exposed by turning on the required LEDs of the supplementary light source 47. Since the widths of the non-scanning regions RN are dependent only on a reproduction magnification M, a lighting width of the supplementary light source 47 can be calculated in the lighting width computation part 73b.

According to the second embodiment, the left edge of the original OR (the leading edge of the original holder 2 with respect to its feed direction) must be placed on the left reference line LL when producing a side-mounted type printing plate. The position of the original OR with respect to the direction perpendicular to the feed direction of the original holder 2 is obtainable from the equation (17). The operator only have to place the original in thus calculated original setting position while the calculated data is being displayed. Hence, readjustment of the original requires merely top-to-bottom adjustment, thus making it an easy task to set the original.

Production of
Top-or-Bottom-Mounted Type Printing Plate

Figure 17A:
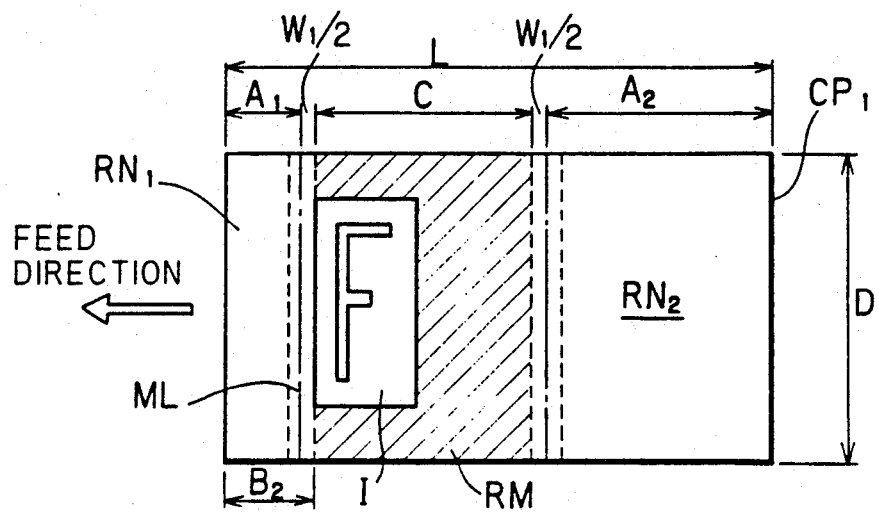
FIGS. 17A to 17C are plan views of a top-or-bottom-mounted type printing plate.

FIG. 17A is a plan view a printing plate $CP_1$ of the top-or-bottom-mounted type. An image I is placed in the center of the printing plate $CP_1$ with respect to the direction perpendicular to the feed direction of a photosensitive material PM. An area which has a predetermined length of $B_2$ and which occupies the leading edge portion in the printing plate $CP_1$ is defined as a holding space.

At the beginning of the production of the printing plate $CP_1$, the operator provides a data input part 71a with the following values:

a) reproduction magnification M for image I;
b) length $B_2$ of holding space;
c) photosensitive material feeding length L; and
d) scanning length C of scanning region RM.

The operator also enters whether the printing plate is of the top-or-bottom-mounted type.

The equation (20) below in place of the equation (18) yields the length $A_1$ of non-scanning region in the leading edge portion.

$$A_1 = B_2 - W_1/2 \qquad (20)$$

Figure 18:
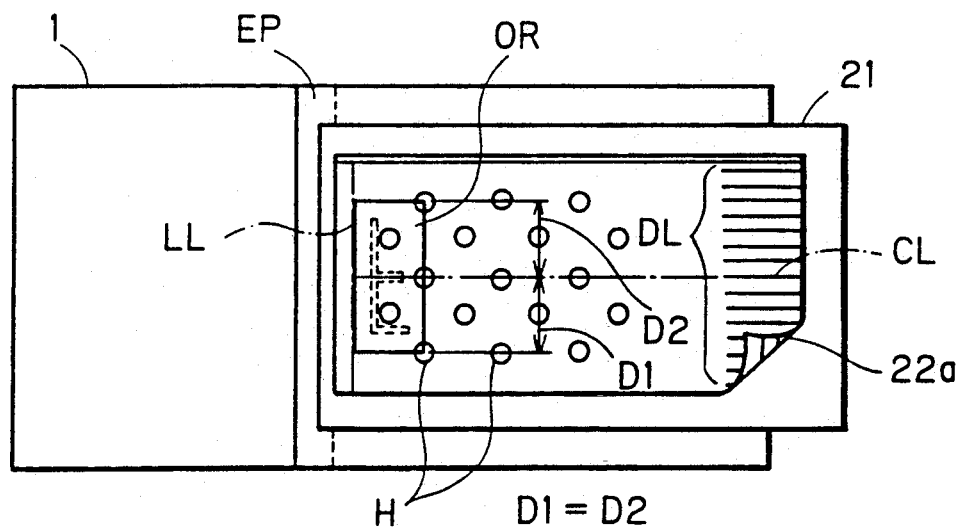

FIG. 18 is a plane view showing the setting position of the original OR in reproducing the printing plate $CP_1$. The image I is in the center of the printing plate with respect to the direction perpendicular to the feed direction of the photosensitive material PM. This means that the top edge and the bottom edge of the original OR take the same distance, i.e., $D1 = D2$, from the center line CL. The left edge of the original OR is on the left reference line LL.

The procedures of producing a printing plate of the top-or-bottom-mounted type are identical to those for the side-mounted type, and therefore omitted here.

Figure 17B:
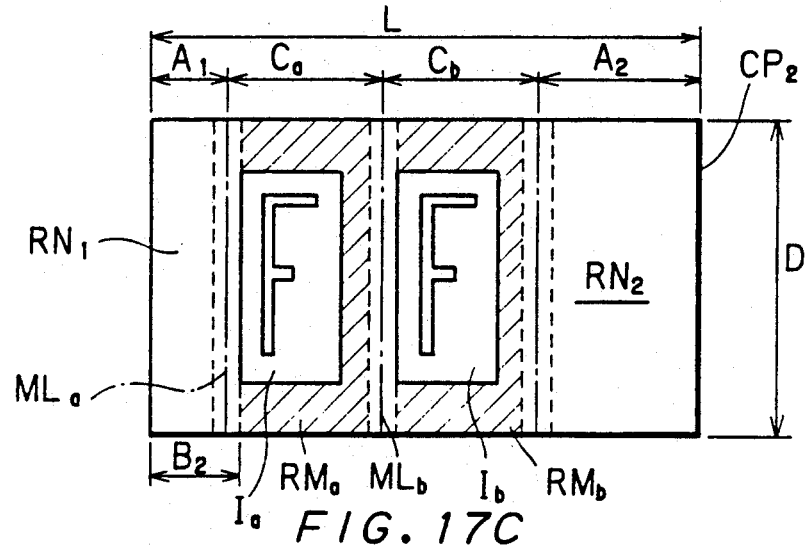
Figure 17C:
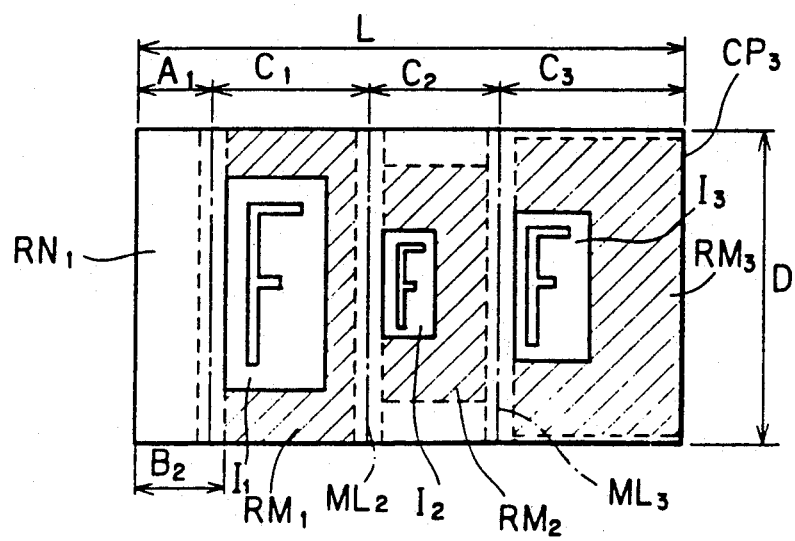

FIG. 17B is a plan view of a top-or-bottom-mounted type printing plate $CP_2$. The printing plate $CP_2$ has two scanning regions $RM_a$ and $RM_b$ which includes images $I_a$ and $I_b$, respectively. FIG. 17C is a plan view of a top-or-bottom-mounted type printing plate $CP_3$. The printing plate $CP_3$ has three scanning regions $RM_1$ to $RM_3$ which includes images $I_1$ to $I_3$, respectively. The equation (20) also yields the lengths $A_1$ of the non-scanning region in the leading edge portion of these printing plates $CP_2$ and $CP_3$. The setting positions of the originals OR are determined as in FIG. 18. In such production accompanying multi-placing where a plurality of images are reproduced from the same single original OR onto the same material as shown in FIGS. 17B and 17C, it is also possible to set the scan-exposure camera to automatically reproduce the images by specifying a reproduction mode as an automatic mode in advance. It requires no explanation that if in multi-placing from different originals, the operator changes the originals before skipping back to Step S47 from Step S54.

As recited above, production of a printing plate of the top-or-bottom-mounted type demands the operator only to align the left edge of an original OR and the left reference line LL and to place the original in such a manner that the top edge and the bottom edge of the original are equidistant from the center line CL. Thus, the original is always placed in the above manner without being affected by changes in an original position or a reproduction magnification. This offers many advantages in terms of simplicity in original mounting.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A camera for reproducing from an original a plurality of images each of a respective magnification, onto a photosensitive material sheet, comprising:

original feed means for feeding an original in an original feeding direction;

photosensitive material feed means for feeding a controlled length of a photosensitive material sheet in a photosensitive material feeding direction;

input means for inputting data relating to respective magnifications for each of said plurality of images and a scanning length of a scanning region corresponding to each selected magnification;

first computation means for calculating a feeding length of said photosensitive material sheet based on each said scanning length;

a projection optical system for projecting image light reflected from said original in the form of a slit onto said photosensitive material sheet, said optical system being adjustable to project light for each image to be reproduced in correspondence with said earlier input magnification data for each of said plurality of images; and scanning control means for adjusting for each image a magnification of said projection optical system according to the respective input reproduction magnification data and for controlling the feed of said photosensitive material sheet and of said original based on the corresponding scanning length and the corresponding feeding length, wherein the magnification of said projection optical system for each of said plurality of images to be reproduced is adjusted prior to the reproduction thereof, said original and said photosensitive material sheet being synchronously fed thereafter while said slit image light is projected onto said photosensitive material sheet to reproduce said plurality of respectively magnified images thereon.

2. A camera for reproducing an image onto a photosensitive material sheet, comprising:

original feed means for feeding an original in an original feeding direction;

photosensitive material feed means for feeding a photosensitive material sheet in a photosensitive material feeding direction;

input means for inputting a scanning length of a scanning region which includes an image to be reproduced, and a reproduction magnification of said image for each image to be reproduced on the sheet;

first computation means for calculating a feeding length of said photosensitive material sheet based on the scanning length;

a projection optical system for projecting image light reflected from said original in the form of a slit onto said photosensitive material sheet;

scanning control means for adjusting a magnification of said projection optical system according to the reproduction magnification and for controlling the feed of said photosensitive material sheet and of said original based on the scanning length and the feeding length;

supplementary exposure means including a plurality of light emitting elements which are arranged in a line along a direction substantially perpendicular to the photosensitive material feeding direction; and second computation means for obtaining a value of the number of said light emitting elements to be turned on, based on the reproduction magnification, wherein the magnification of said projection optical system is adjusted prior to the reproduction of said image, and then said original and said photosensitive material sheet are synchronously fed while said slit image light is projected onto said photosensitive material sheet, and wherein portions of said light emitting elements, according to the value, are turned on from both ends of said supplementary exposure means to thereby expose a non-scanning region, said non-scanning region being not exposed by said image light.

3. A camera of claim 2, wherein said supplementary exposure means further includes a flare prevention means having a plurality of holes each of which corresponds to a bottom of said light emitting elements, whereby light from each of said light emitting elements is directed through each of said holes toward said photosensitive material sheet.

4. A camera of claim 3, wherein each hole is formed as a rectangle.

5. A camera for reproducing an image onto a photosensitive material sheet, comprising:

original feed means for feeding an original in an original feeding direction;

photosensitive material feed means for feeding a photosensitive material sheet in a photosensitive material feeding direction;

input means for inputting a scanning length of a scanning region which includes an image to be reproduced, and a reproduction magnification of said image for each image to be reproduced on the sheet;

first computation means for calculating a feeding length of said photosensitive material sheet based on the scanning length;

a projection optical system for projecting image light reflected from said original in the form of a slit onto said photosensitive material sheet;

scanning control means for adjusting a magnification of said projection optical system according to the reproduction magnification and for controlling the feed of said photosensitive material sheet and of said original based on the scanning length and the feeding length;

wherein the magnification of said projection optical system is adjusted prior to the reproduction of said image, and then said original and said photosensitive material sheet are synchronously fed while said slit image light is projected onto said photosensitive material sheet, and wherein said original feed means comprises a platen made of a transparent material, and a cover sheet, disposed above said platen, for holding said original provided on said platen in cooperation with said platen, said cover sheet being one of a transparent and a semi-transparent sheet.

6. A camera of claim 5, wherein said cover sheet has a center line extending along the original feeding direction, a reference line extending along a direction perpendicular to the original feeding direction and a plurality of distance lines parallel to said center line.

7. A camera of claim 6, wherein said distance lines are arranged at regular intervals.

8. A camera of claim 6, wherein said input means also includes means for inputting a width of said photosensitive material sheet and for input a width of a holding space, said holding space being on a top or a bottom portion of said photosensitive material sheet.

9. A camera of claim 8, further comprising:

a third computation means for calculating positioning data of said original with respect to a direction perpendicular to the original feeding direction, based on the width of said photosensitive material sheet, the width of said holding space and the reproduction magnification; and displaying means for displaying the positioning data, wherein said original is located so an edge thereof coincides with said reference line, and is further arranged according to the positioning data displayed on said displaying means.

10. A camera of claim 6, wherein said input means also includes means for inputting a width of a holding space, said holding space being on a side portion of said photosensitive material sheet.

11. A camera of claim 10, further comprising:

a fourth computation means for calculating a length of said photosensitive material to be fed prior to the reproduction of said image, based on the width of said holding space, wherein said scanning control means further includes means for controlling the feed of said photosensitive material sheet by the length prior to the reproduction of said image.

12. A camera for reproducing an image onto a photosensitive material sheet, comprising:

original feed means for feeding an original in an original feeding direction;

photosensitive material feed means for feeding a photosensitive material sheet in a photosensitive material feeding direction;

input means for inputting a scanning length of a scanning region which includes an image to be reproduced, and a reproduction magnification of said image for each image to be reproduced on the sheet;

first computation means for calculating a feeding length of said photosensitive material sheet based on the scanning length;

a projection optical system for projecting image light reflected from said original in the form of a slit onto said photosensitive material sheet;

scanning control means for adjusting a magnification of said projection optical system according to the reproduction magnification and for controlling the feed of said photosensitive material sheet and of said original based on the scanning length and the feeding length;

wherein the magnification of said projection optical system is adjusted prior to the reproduction of said image, and then said original and said photosensitive material sheet are synchronously fed while said slit image light is projected onto said photosensitive material sheet, and wherein said photosensitive material feed means includes a motor rotatable in two opposite directions, first and a second roller sets for feeding said photosensitive material, said first roller set being placed in a first position and said second roller set being placed in a second position, respectively, along the photosensitive material feeding direction, and power transmit means for transmitting drive force from said motor to either of said first roller set and second roller set.

13. A camera of claim 12, wherein said power transmit means includes a one-way clutch which transmits drive force of said motor in the photosensitive material feeding direction, said one-way clutch being axially mounted to either of the rollers of said second roller set.

14. A camera of claim 13, wherein a feeding speed of said second roller set is greater than a feeding speed of said first roller set when said photosensitive material sheet is fed in the photosensitive material feeding direction.

15. A camera for reproducing from an original a plurality of images, each of a respective magnification, onto a photosensitive material sheet to thereby produce a side-mounted type printing plate, said side-mounted type printing plate having a holding space on a top or a bottom portion of said photosensitive material sheet, said camera comprising:

original feed means for feeding an original in an original feeding direction;

photosensitive material feed means for controllably feeding a length of a photosensitive material sheet in a photosensitive material feeding direction;

input means for inputting data relating to a width of said photosensitive material sheet, a width of a holding space, and a respective reproduction magnification for each image to be reproduced;

a projection optical system for projecting image light reflected from said original in the form of a slit onto said photosensitive material sheet;

computation means for calculating positioning data of said original with respect to a direction perpendicular to the original feeding direction, based on the width of said photosensitive material sheet, the width of said holding space, and the respective reproduction magnifications; and displaying means for displaying the positioning data.

16. A camera for reproducing an image onto a photosensitive material sheet to thereby produce a side-mounted type printing plate, said side-mounted type printing plate having a holding space on a top or a bottom portion of said photosensitive material sheet, original feed means for feeding an original in an original feeding direction;

photosensitive material feed means for feeding a photosensitive material sheet in a photosensitive material feeding direction;

input means for inputting a width of said photosensitive material sheet, a width of a holding space and a reproduction magnification of an image to be reproduced;

a projection optical system for projecting image light reflected from said original in the form of a slit onto said photosensitive material sheet;

computation means for calculating positioning data of said original with respect to a direction perpendicular to the original feeding direction, based on the width of said photosensitive material sheet, the width of said holding space and the reproduction magnification; and displaying means for displaying the positioning data, wherein said original feed means comprises a platen made of a transparent material, and a positioning sheet disposed above said platen, said positioning sheet being one of a transparent and a semi-transparent sheet.

17. A camera of claim 16, wherein said positioning sheet has a plurality of positioning lines parallel to the original feeding direction and a reference line substantially perpendicular to said positioning lines, and wherein said original is located so that an edge thereof coincides with said reference line, and is further arranged according to the positioning data displayed on said displaying means, to thereby be positioned.

18. A camera for reproducing from an original a plurality of images, each of a selected respective modification onto a photosensitive material sheet to thereby produce a top-or-bottom-mounted type printing plate, said top-or-bottom-mounted type printing plate having a holding space on a leading edge portion of said photosensitive material sheet with respect to a photosensitive material feeding direction, said camera comprising:

original feed means for feeding an original an in original feeding direction;

photosensitive material feed means for controllably feeding a length of a photosensitive material sheet in the photosensitive material feeding direction;

input means for inputting data relating to a selected width of a holding space, a reproduction magnification for the image to be reproduced, whether a top or a bottom-mounted type printing plate is selected, and a scanning length to ensure formation of a non-scanned region for holding of the printing plate in subsequent use;

a projection optical system for projecting image light reflected from said original in the form of a slit onto said photosensitive material sheet;

computation means for calculating a length of said photosensitive material sheet to be fed, prior to reproduction of an image, based on the selected width of said holding space; and scanning control means for controlling the feed of said photosensitive material sheet and of said original, wherein said photosensitive material sheet is fed in said calculated length prior to the reproduction of said image, and thereafter said original and said photosensitive material sheet are synchronously fed while said slit image light is projected onto said photosensitive material sheet to generate a reproduced image of selected magnification while leaving said non-scanned region free to enable holding of said selected type of printing plate thereat.

19. A camera for reproducing an image onto a photosensitive material sheet to thereby produce a top-or-bottom-mounted type printing plate, said top-or-bottom mounted type printing plate having a holding space on a leading edge portion of said photosensitive material sheet with respect to a photosensitive material feeding direction, said camera comprising:

original feed means for feeding an original in an original feeding direction;

photosensitive material feed means for feeding a photosensitive material sheet in a photosensitive material feeding direction;

input means for inputting a width of a holding space;

a projection optical system for projecting image light reflected from said original in the form of a slit onto said photosensitive material sheet;

computation means for calculating a length of said photosensitive material sheet to be fed prior to reproduction of an image, based on the width of said holding space; and scanning control means for controlling the feed of said photosensitive material sheet and of said original, wherein said photosensitive material sheet is fed by the length prior to the reproduction of said image, and thereafter said original and said photosensitive material sheet are synchronously fed while said slit image light is projected onto said photosensitive material sheet, wherein said original feed means comprises a positioning sheet having a center line extending along the original feeding direction, a reference line extending along a direction perpendicular to the original feeding direction and a plurality of distance lines parallel to said center line.

20. A photosensitive material feed unit for feeding a photosensitive material in a photosensitive material feeding direction, comprising:

a motor rotatable in two opposite directions;

a first roller set and a second roller set for feeding said photosensitive material, said first roller set and said second roller set being placed in first and second positions respectively along the photosensitive material feeding direction, said second position being further along the photosensitive material feeding direction than said first position; and power transmit means for transmitting drive force from said motor to said first roller set as the motor rotates in both of said two opposite directions and for transmitting the drive force from said motor to said second roller set only in a direction corresponding to the photosensitive material feeding direction, wherein said power transmit means includes a member for receiving the drive force of said motor as the motor rotates in both of said two opposite directions and a one-way clutch which is connected to said receiving member, said one-way clutch being axially mounted to one of the rollers of said second roller set to transmit the drive force from said member to said one of the rollers of the second roller set only in the direction corresponding to the photosensitive material feeding direction.

21. A photosensitive material feed unit of claim 20, wherein said receiving member and said one of the rollers of the second roller set rotate in a direction opposite to the photosensitive material feeding direction when said motor is driven to rewind said photosensitive material, and an angular velocity of said receiving member is larger than an angular velocity of said one of the rollers of the second roller set.

22. A method of reproducing form an original a plurality of images, each of a respective magnification, onto a photosensitive material sheet, comprising:

setting an original at a predetermined position;

inputting data relating to respective magnifications for each of said plurality of images and a scanning length of a scanning region corresponding to each selected magnification;

calculating a feeding length of said photosensitive material sheet based on each scanning length;

adjusting a magnification of a projection optical system prior to reproduction of each of said images according to the corresponding reproduction magnification selected therefor, said projection optical system projecting image light reflected from said original for each image in the form of a slit onto said photosensitive material sheet; and feeding synchronously said original and said photosensitive material sheet while said slit image light is projected onto said photosensitive material sheet to reproduce said plurality of images to said selected magnifications.

23. A method of reproducing an image of an original onto a photosensitive material sheet, comprising:

setting an original at a predetermined position;

input a scanning length of a scanning region which includes an image to be reproduced, and a reproduction magnification of said image;

calculating a feeding length of said photosensitive material sheet based on the scanning length;

adjusting a magnification of a projection optical system prior to reproduction of said image according to the reproduction magnification, said projection optical system projecting image light reflected from said original in the form of a slit onto said photosensitive material sheet;

feeding synchronously said original and said photosensitive material sheet while said slit image light is projected onto said photosensitive material sheet;

obtaining a value of a number of light emitting elements to be turned on, based on the reproduction magnification; and turning portions of said light emitting elements on, according to the value, so that a non-scanning region which is not exposed by said slit image light is exposed.

24. A method of claim 22, wherein said step of setting an original includes:

inputting a width of said photosensitive material sheet and a width of a holding space, said holding space being on a top or a bottom portion of said photosensitive material sheet;

calculating positioning data of said original with respect to a direction perpendicular to the original feeding direction, based on the width of said photosensitive material sheet, the width of said holding space and the selected reproduction magnification data;

displaying the positioning data; and locating said original according to the positioning data.

25. A method of claim 22, further comprising:

inputting a width of a holding space, said holding space being on a side portion of said photosensitive material sheet;

calculating a length of said photosensitive material to be fed prior to the reproduction of said image, based on the width of said holding space; and feeding said photosensitive material sheet by the length prior to the reproduction of said image.

* * * * *